(12) United States Patent
Underwood et al.

(10) Patent No.: US 12,632,431 B2
(45) **Date of Patent: *May 19, 2026**

(54) ELECTRONIC THREAT ASSESSMENT SYSTEM

(71) Applicants: James Matthew Underwood, Kennesaw, GA (US); Larry Cullen Underwood, Canton, GA (US); Davidson Glenn Lucas, Roswell, GA (US)

(72) Inventors: James Matthew Underwood, Kennesaw, GA (US); Larry Cullen Underwood, Canton, GA (US); Davidson Glenn Lucas, Roswell, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/909,638

(22) Filed: Oct. 8, 2024

(65) Prior Publication Data

US 2025/0036606 A1 Jan. 30, 2025

Related U.S. Application Data

(63) Continuation of application No. 17/477,231, filed on Sep. 16, 2021, now Pat. No. 12,141,113.

(60) Provisional application No. 63/079,698, filed on Sep. 17, 2020.

(51) Int. Cl.
| | |
|---|---|
| *G06F 19/00* | (2018.01) |
| *F41A 19/16* | (2006.01) |
| *G06F 16/22* | (2019.01) |
| *G06F 16/783* | (2019.01) |
| *G06F 18/2431* | (2023.01) |
| *G06V 40/10* | (2022.01) |
| *G08B 25/10* | (2006.01) |
| *H04N 7/18* | (2006.01) |
| *H04N 23/20* | (2023.01) |

(52) U.S. Cl.
CPC .............. *G06F 16/22* (2019.01); *F41A 19/16* (2013.01); *G06F 16/7837* (2019.01); *G06F 18/2431* (2023.01); *G06V 40/10* (2022.01); *G08B 25/10* (2013.01); *H04N 7/18* (2013.01); *H04N 23/20* (2023.01)

(58) Field of Classification Search
CPC ........ G06N 3/08; G06N 3/048; G06F 21/554; G06F 16/2477; G06F 16/90335; G06F 16/2455; G06F 2221/2111; G06F 11/3438; G06F 16/245; G06F 16/26; F41A 19/16; H04N 7/181; H04N 23/66; H04N 23/65; H04N 23/69
USPC ...................................................... 235/400
See application file for complete search history.

(56) References Cited

U.S. PATENT DOCUMENTS

| | | | |
|---|---|---|---|
| 8,229,163 B2 | 7/2012 | Coleman et al. |
| 8,400,448 B1 | 3/2013 | Doyle, Jr. |
| 8,739,672 B1 | 6/2014 | Kelly |

(Continued)

FOREIGN PATENT DOCUMENTS

| | | |
|---|---|---|
| CH | 632585 A5 | 10/1982 |
| KR | 20090113837 A | 11/2009 |

*Primary Examiner* — Daniel St Cyr

(57) ABSTRACT

A system for assessing threats includes a method of detecting a physical location of the system, establish a connection to at least one database, scanning a proximate area, prioritizing a plurality of identified objects, comparing data for at least one of the identified object to data from the at least one database, and outputting at least one notification.

20 Claims, 13 Drawing Sheets

(56)                    References Cited

U.S. PATENT DOCUMENTS

| | | | |
|---|---|---|---|
| 9,068,794 | B1 | 6/2015 | Sammut |
| 9,121,671 | B2 | 9/2015 | Everett |
| 9,310,163 | B2 | 4/2016 | Bay |
| 9,323,061 | B2 | 4/2016 | Edwards et al. |
| 9,464,871 | B2 | 10/2016 | Bay |
| 10,274,286 | B2 | 4/2019 | Maryfield et al. |
| 10,458,753 | B2 | 10/2019 | Sammut et al. |
| 10,948,265 | B2 | 3/2021 | Sammut et al. |
| 12,141,113 | B2 * | 11/2024 | Underwood ........... H04N 23/20 |
| 2006/0028556 | A1 | 2/2006 | Bunn et al. |
| 2013/0192451 | A1 | 8/2013 | Scott et al. |
| 2016/0252325 | A1 | 9/2016 | Sammut et al. |
| 2016/0330601 | A1 | 11/2016 | Srivastava |
| 2018/0372445 | A1 | 12/2018 | Myers et al. |
| 2019/0186857 | A1 | 6/2019 | Galie et al. |
| 2020/0180784 | A1 | 6/2020 | Frucht |
| 2020/0333096 | A1 | 10/2020 | Galie et al. |

* cited by examiner

ELECTRONIC THREAT ASSESSMENT SYSTEM

CROSS REFERENCE TO RELATED APPLICATIONS

This application is a continuation of U.S. patent application Ser. No. 17/477,231 ("the '231 application") filed Sep. 16, 2021, which is related to and claims priority benefit from U.S. Provisional Application No. 63/079,698 ("the '698 application"), filed on Sep. 17, 2020 and entitled "ELECTRONIC THREAT ASSESSMENT SYSTEM." The '231 application and the '698 application are each hereby incorporated in their entirety by this reference.

FIELD OF THE INVENTION

The field of the invention relates to electronic threat assessment systems, particularly electronic threat assessment systems and related methods that can be incorporated in one or more of firearms, vehicles, aircraft, satellites, or other tools.

BACKGROUND

Many law enforcement, first responders, and military personnel now utilize a wearable audio, video, or photographic recording system used to record events in which the officer or operator is involved. For example, some police departments have adopted body cameras as standard equipment for officers to improve public trust in the law, expand transparency, and to reduce lawsuits targeting police through digital evidence provided by the recorded footage. However, existing systems fail to improve safety or improve the effectiveness of the operator. There is a need to improve safety for both the operator along with other personnel in his/her vicinity and/or field of view. In addition, there is a need to leverage new technologies to increase the information and analysis available to the operator to more quickly identify threats, deescalate non-threats, and reduce unnecessary injuries or deaths. These systems are designed to be implemented with increased and/or improved training for operators and/or officers.

To increase safety and effectiveness of law enforcement, first responders, military personnel, and other relevant operators, it may be desirable to design new electronic threat assessment systems that analyze input from various sources and provide immediate data and feedback.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method of assessing threats comprises: detecting a physical location of the system; establishing a connection to at least one database; scanning a proximate area; prioritizing a plurality of identified objects; comparing data for at least one of the identified object to data from the at least one database; and outputting at least one notification.

According to certain embodiments of the present invention, a system for assessing threats comprises: a processor and a non-transitory computer-readable medium coupled to the processor, the non-transitory computer-readable medium comprising instructions that, when executed by the processor, cause the processor to: detect a physical location of the system; establish a connection to at least one database; scan a proximate area; prioritize a plurality of identified objects; compare data for at least one of the identified object to data from the at least one database; and output at least one notification.

According to certain embodiments of the present invention, a method of assessing threats comprises: detecting a physical location of the system; establishing a connection to at least one database; scanning a proximate area; prioritizing a plurality of identified objects; comparing data for at least one of the plurality of identified objects to data from the at least one database; and outputting at least one notification.

BRIEF DESCRIPTION OF THE DRAWINGS

FIG. 3A is a right side view of an outer member of the monolithic upper receiver assembly of FIG. 1.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
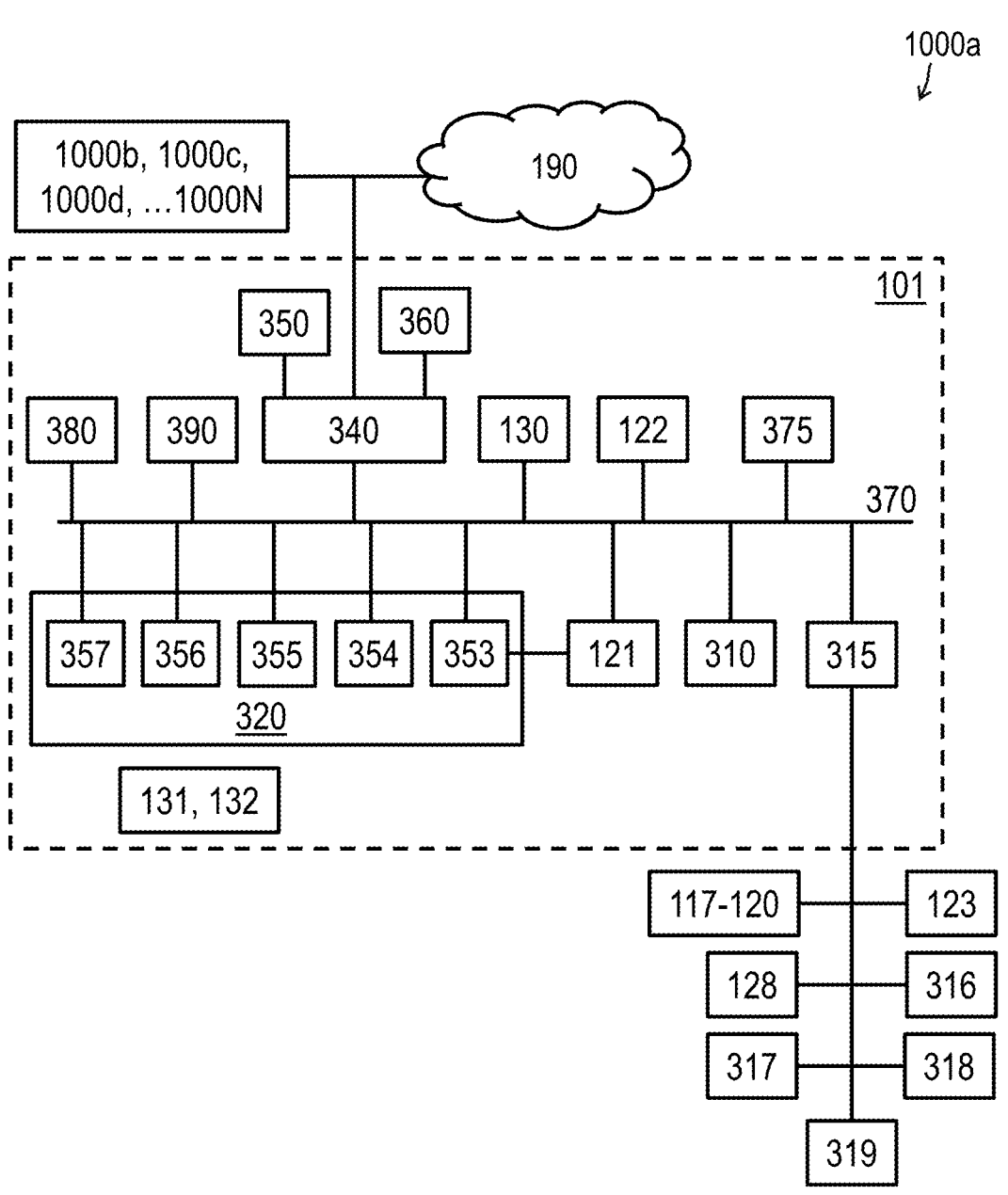
FIG. 1 is a component-level diagram of some embodiments of a threat assessment system according to certain embodiments of the present invention.

FIG. 1 shows a component-level diagram of some embodiments of an illustrative threat assessment system 1000*a* for detecting and assessing threats. Particularly, in this example, threat assessment system 1000*a* comprises a computing device 101 having a processor 310 interfaced with other hardware via bus 370. The microprocessor 310 can be provided by a general purpose microprocessor or by a specialized microprocessor (e.g., an ASIC). In some embodiments, system 1000*a* may include a single microprocessor which can be referred to as a central processing unit (CPU). In other embodiments, system 1000*a* includes two or more microprocessors, for example, a CPU providing some or most of the system functionality and a specialized microprocessor performing some specific functionality. A skilled artisan would appreciate the fact that other schemes of processing tasks distribution among two or more microprocessors are within the scope of this disclosure. A memory 320, which can comprise any suitable tangible (and non-transitory) computer-readable medium such as RAM, ROM, EEPROM, or the like, embodies program components that configure operation of the computing device.

The memory 320 may include a plurality of program modules. Although FIG. 1 illustrates five modules 353-357, the memory 320 may include any number of modules. Modules 353, 354, 355, 356, and 357 are depicted to illustrate how a device may be configured to generate output data to an operator. In this example, a detection module 354 configures processor 310 to monitor a human or object via at least one sensor to provide relevant input data. For example, module 354 may sample one or more of sensors 121, 130 in order to discern, detect, analyze a human or object. The system 1000*a* may include any number and type of sensors. In some embodiments, the sensor 121 is a camera system (including at least one camera) and the sensor 130 is at least one microphone. Other potential sensors for the system 1000*a* include wind detection sensors, humidity sensors, temperature sensors, etc. These additional sensors may provide data for calculating ballistics used to recommend tactics, real-time calculations of aiming adjustments, and any other appropriate information.

Determination module 355 represents a program component that analyzes image data (including still images and/or video data) in some cases combined with audio data to identify/classify the human or object perceived and/or to assign a threat level. Particularly, module 355 comprises code that determines, based on all available input data, whether the data matches a known person or object in an available database and/or assigns a threat level to the human or object.

Generation module 356 represents programming that causes processor 310 to generate and transmit a signal to communication interface module 340, which causes communication interface module 340 to generate the selected output. For example, generation module 356 may access stored information or commands to send to communication interface module 340. As another example, generation module 356 may receive a desired type of data and utilize signal processing algorithms to generate an appropriate signal to send to communication interface module 340 and/or to input/output (I/O) interface module 315. Some embodiments may utilize multiple output devices in concert to output the data. In some embodiments, processor 310 may stream or transmit the data to the communication interface module 340 and/or to the I/O interface module 315.

Artificial intelligence module 357 utilizes artificial intelligence to efficiently analyze, classify, and act on input data (including portions of images, audio, and other input). The artificial intelligence module 357 combines large amounts of data with rapid processing and intelligent algorithms, allowing the system 1000*a* to learn automatically from patterns or features in the data. Accordingly, the artificial intelligence module 357 produces cognitive computing resulting in a natural, human-like interaction with the operator.

The computing device 101 may include a communication interface module 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/ 802.16 protocol family, WIFI, Bluetooth®, at least one protocol of the HSPA/GSM/GPRS/EDGE protocol family, TDMA protocol, UMTS protocol, LTE protocol, broadband cellular network technology (including 3G, 4G, 5G, etc.), and/or at least one protocol of the CDMA/IxEV-DO protocol family. The communication interface module 340 may include one or more communication modules (e.g., modules 350, 360, etc.) to facilitate various types of communication (cellular, WIFI, Bluetooth, etc.). Although FIG. 1 shows two modules (350 and 360), the communication interface module 340 may include any number of modules. In some embodiments, module 350 is a cellular/mobile connection module and module 360 is a WIFI connection module. The communication interface module 340 may connect the system 1000*a* to a network 190 (i.e., the internet) and/or to one or more other systems 1000*b*, 1000*c*, 1000*d*, ... 1000N. The connection to the network 190 allows the system 1000*a* to access data stored in cloud-based databases (or other remote databases), to access the internet to analyze input data, and/or to upload input data collected (including data from sensors 121, 130, among others). In some embodiments, a connection to other nearby similar systems (e.g., 1000*b*, 1000*c*, 1000*d*, ... 1000N) allows the systems 1000 to pool and share resources (including processing and memory resources, data sharing, among others) in a mesh network to increase computational efficiency, decrease lag and delay, increase the volume and speed of data shared to centralized servers, and any other appropriate advantages.

FIG. 1 shows the camera(s) 121, the secondary device(s) 122, and the microphone(s) 130 as directly connected to the system bus 370. However, in some embodiments, one or more of these modules may be connected to the I/O interface module 315 (or these object(s) may be connected to both the system bus 370 and the I/O interface module 315). In addition, FIG. 1 shows the image interpretation and processing module 353 (which receives information from camera(s) 121) as directly connected to both the camera(s) 121 and the system bus 370 (as part of or through a connection to the memory 320). However, in some embodiments, the image interpretation and processing module 353 may be connected to only one of the camera(s) 121 and the system bus 370.

As shown in FIG. 1, the computing device 101 may include a Global Positioning System (GPS) module 380 and a localization module 390 for discerning location information for the system 1000a. In some embodiments, the localization module 390 includes a suite of accelerometers, gyroscopes, and/or other systems for calculating/discerning the local spatial location, orientation, and position of the system 1000a while the GPS module 380 determines a geographic location of the system 1000a.

Figure 5A:
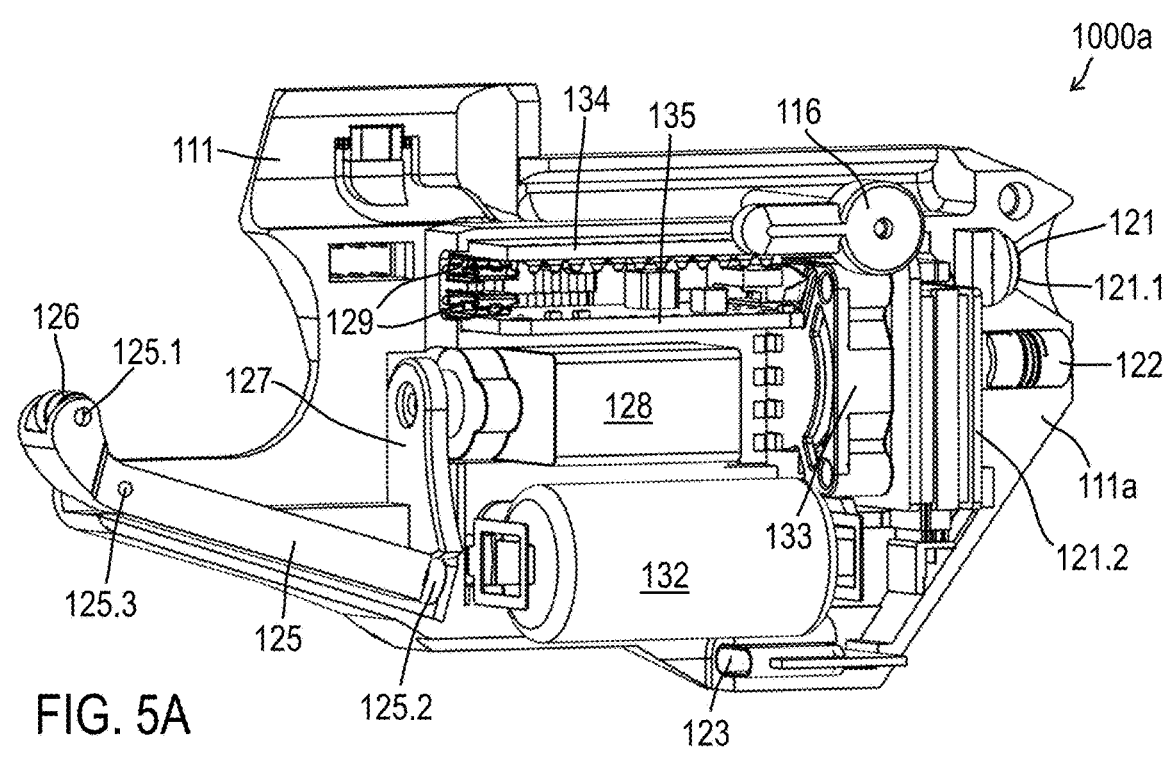
FIG. 5A is a right rear partial perspective view of the threat assessment system of FIG. 2 with a right side housing removed.
Figure 5B:
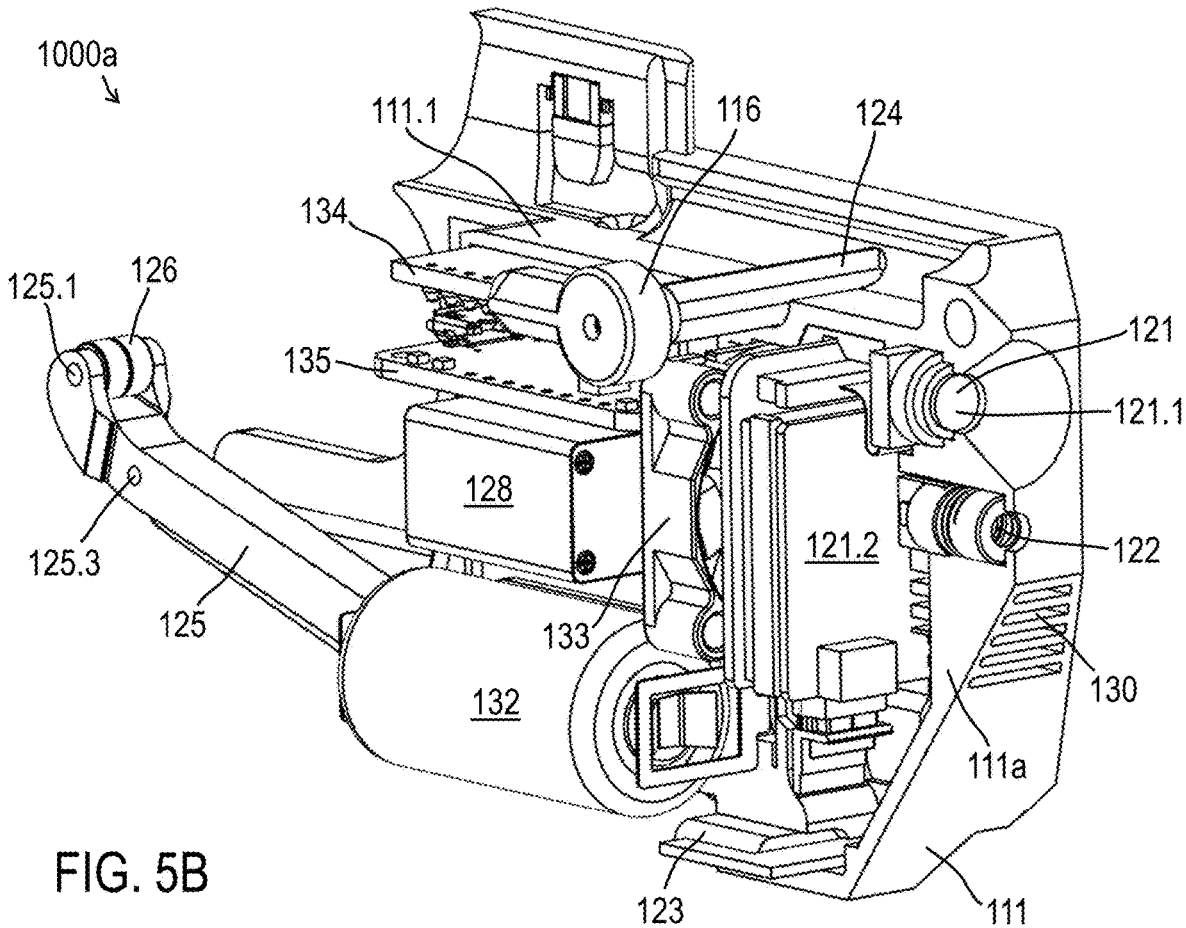
FIG. 5B is a right front partial perspective view of the threat assessment system of FIG. 2 with a right side housing removed.

The camera 121 may be a high resolution camera capable of collecting large amounts of data. For example, the camera 121 may be a 600-megapixel camera capable of capturing more information than the human eye. As shown in FIGS. 5A and 5B, the camera 121 may include at least one lens 121.1, at least one sensor 121.2, and any other relevant component. In some embodiments, the at least one lens 121.1 includes 8× thermal optical zoom that can be combined with digital zoom. In some cases, the at least one lens 121.1 includes a replaceable lens and/or a replaceable filter such the system 1000a can be configured for a specific task or mission (night vision, thermal, long distance, etc.). In some embodiments, the at least one sensor 121.2 includes complementary metal-oxide semiconductor (CMOS) image sensor(s) and/or charge-coupled device (CCD) imager sensor(s).

Local storage module 375 is an additional component that can replaced with upgraded or expanded modules and is attached to the system bus 370. The local storage module 375 may be a fixed storage media, a modular removable media, or any other appropriate storage device. The local storage module 375 may be compatible with, for example, auxiliary hard drives (including flash memory), RAM, communication interfaces, etc. In some embodiments, the local storage module 375 allows some data to be stored locally including specific target data (related to a search for a specific target), local database information based on geographic location (e.g., based on GPS module 380), data learned/created by the artificial intelligence module 357, and/or any other appropriate information.

In some embodiments, the I/O interface module 315 may be used to facilitate connection to devices such as one or more displays, keyboards, mice, speakers, microphones, cameras, and/or other hardware used to input data or output data. For example, in some embodiments, the I/O interface module 315 is connected to inputs, such as user controls 117-120 (see FIGS. 2-3). The user controls 117 and 118 may function as a power on/off control button for the user. In some embodiments, the user controls 119 and 120 may function as a control for switching modes, for operating the secondary device(s) 122, and/or for any other appropriate function. The I/O interface module 315 may interface with at least one Universal Serial Bus (USB) port 123, at least one micro USB port 129, and any other appropriate port which can operate as either an input or an output. The I/O interface module 315 may also interface with one or more types of output including, for example, a trigger servo 128 for adjusting resistance of the trigger 11, an output module 316 to adjust the resistance created by trigger arm 125, an auditory output module 317, a visual output module 318, a haptic output module 319, and/or any other appropriate output device. The auditory output module 317 may include a sound/beep, spoken words describing available data, or any other auditory output and may be delivered through a speaker, through an earpiece (wired or wireless) worn by the operator, through an audio/video system of a vehicle, through a remote-operated computer system, or by any other appropriate manner. The visual output module 318 may include a flashing light, text describing available data, or any other visual output and may be delivered through a small screen on the device (e.g., threat assessment system 1000a), through a head-up display (HUD) device (wired or wireless) worn by the operator, through an optic or scope of the firearm 10, through an audio/video system of a vehicle, or by any other appropriate manner.

The system 1000a may also include at least one battery 131, 132. In some embodiments, the at least one battery 131, 132 can be provided by a replaceable rechargeable battery pack, a CR123A battery, and/or any other appropriate power source.

Figure 5C:
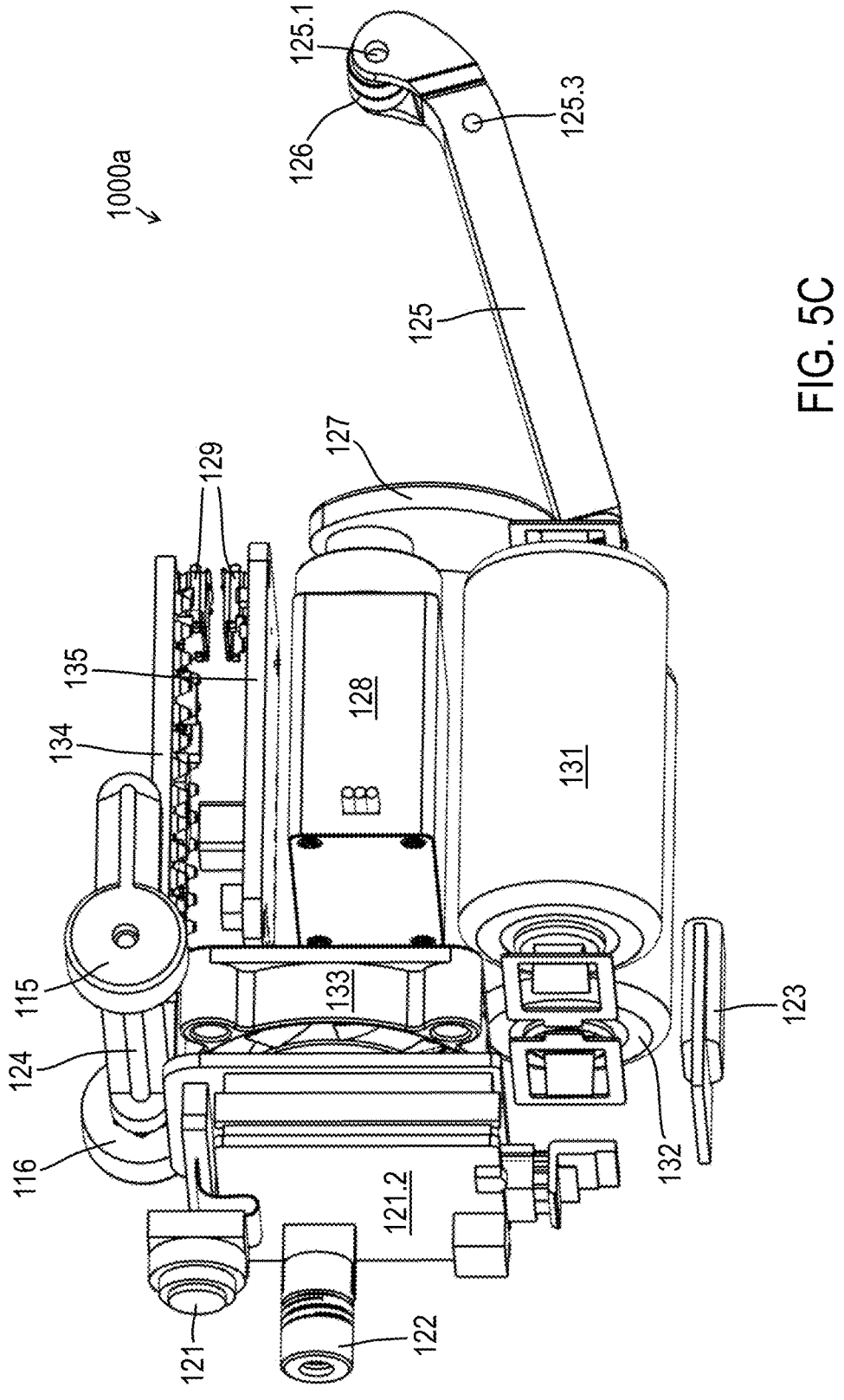
FIG. 5C is a left front partial perspective view of the threat assessment system of FIG. 2 with left and right side housings removed.

In some embodiments, the bus 370, the processor 310, the I/O interface module 315, the memory 320, the communication interface module 340, module 350, module 360, GPS module 380, the localization module 390, and/or any other relevant components are arranged on at least one circuit board. For example, as shown in FIGS. 5A-5C, the system 1000a may include a first circuit board 134 and a second circuit board 135 for these components. In addition, the system 1000a may include a fan 133 to cool the internal components.

Figure 2:
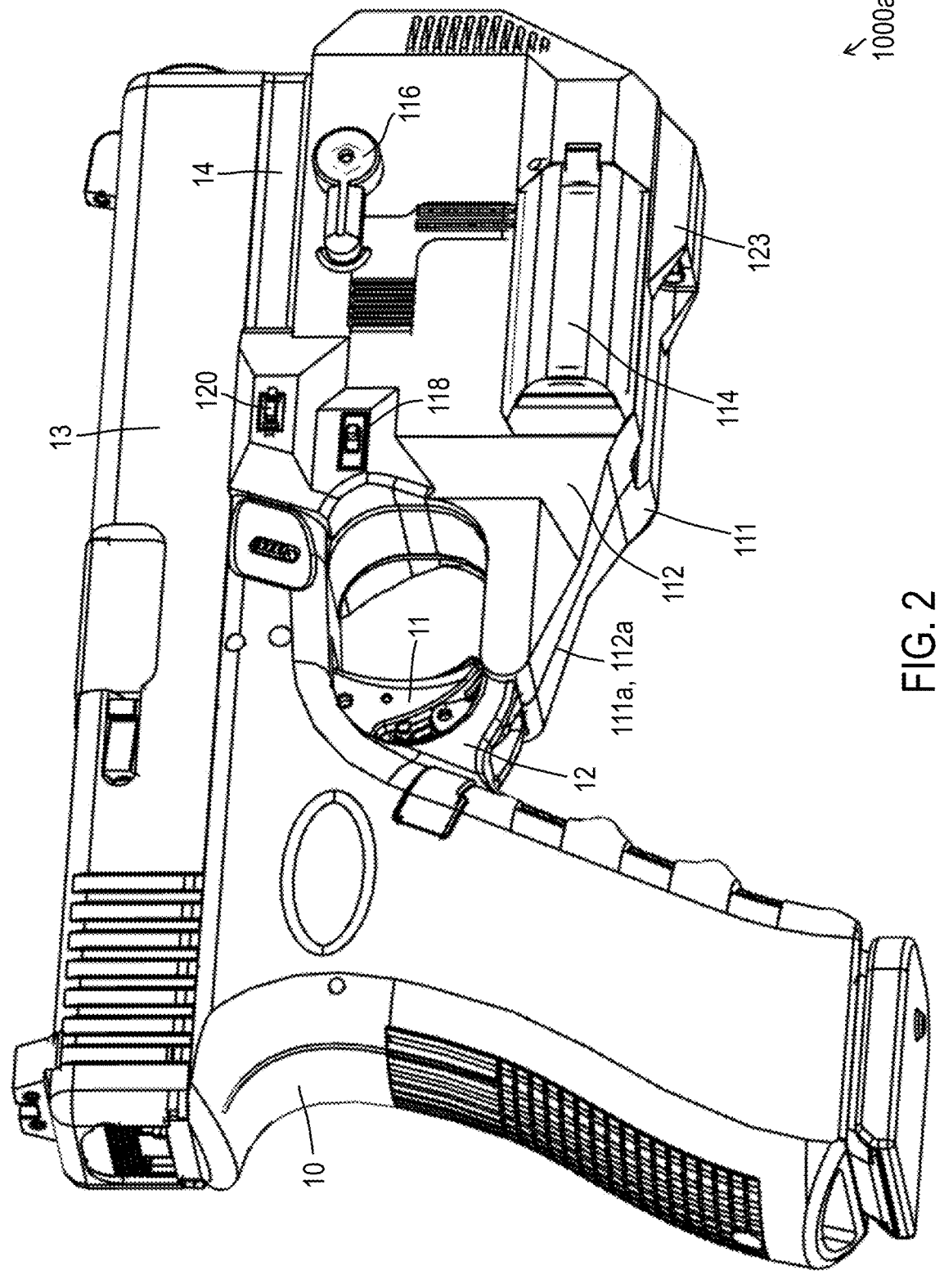
FIG. 2 is a right side perspective view of a firearm including the threat assessment system of FIG. 1.
Figure 3:
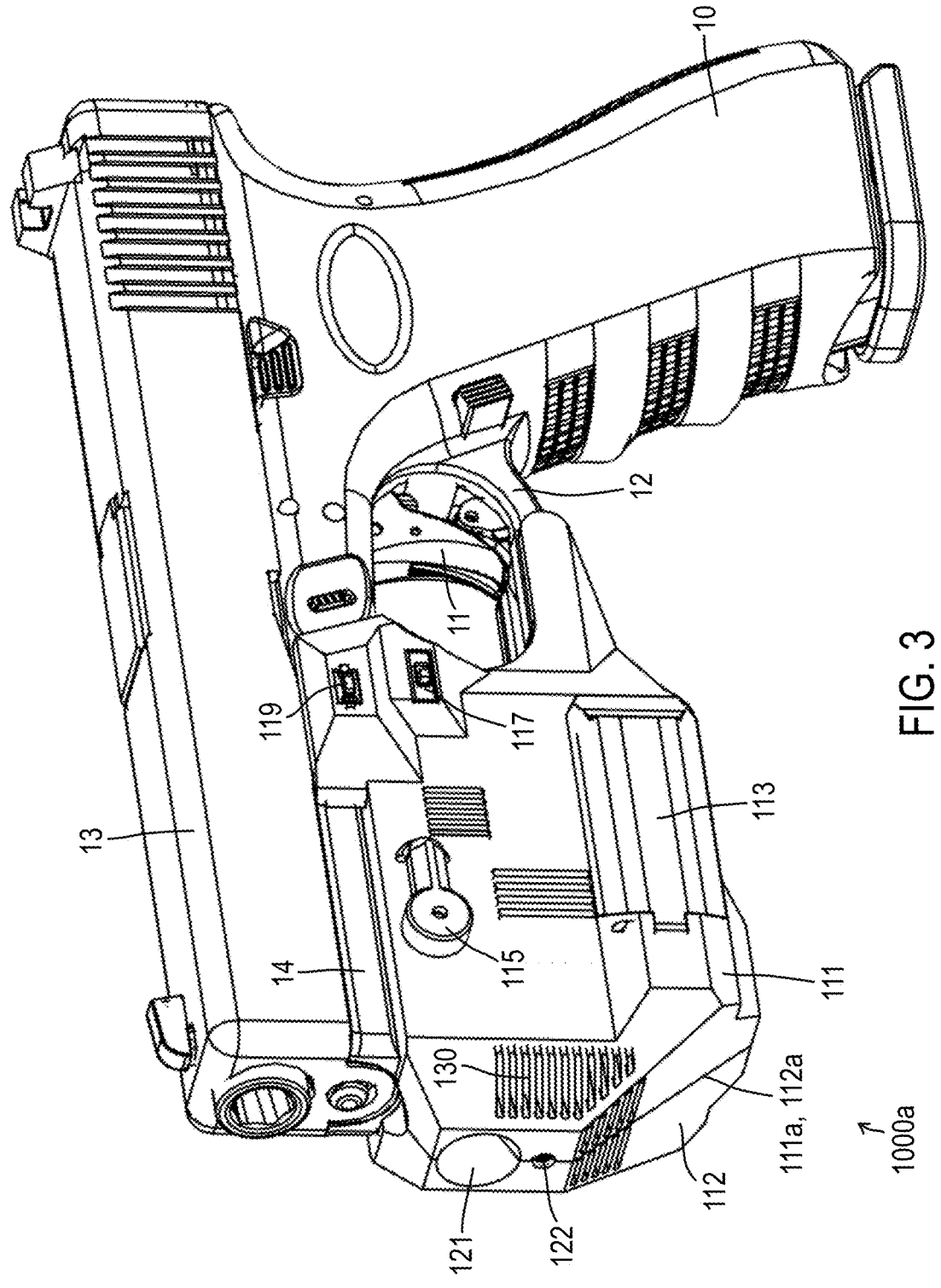
FIG. 3 is a left side perspective view of the firearm of FIG. 2.
Figure 4A:
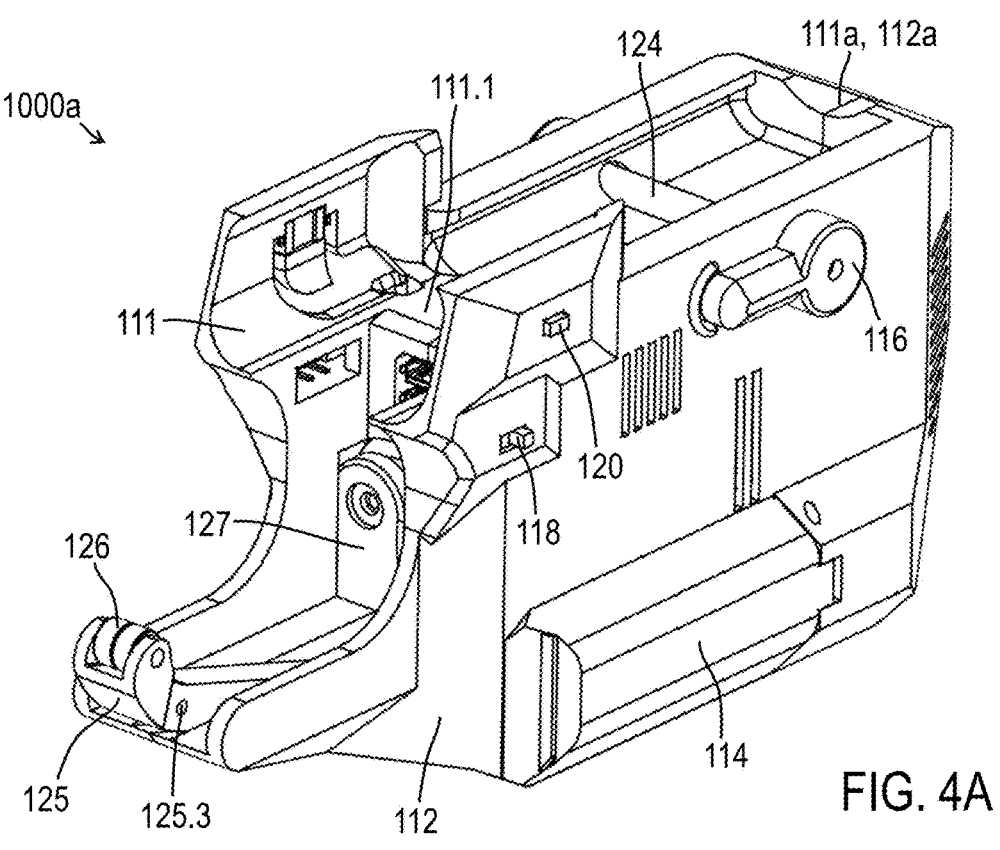
FIG. 4A is a right rear perspective view of the threat assessment system of FIG. 2.
Figure 4B:
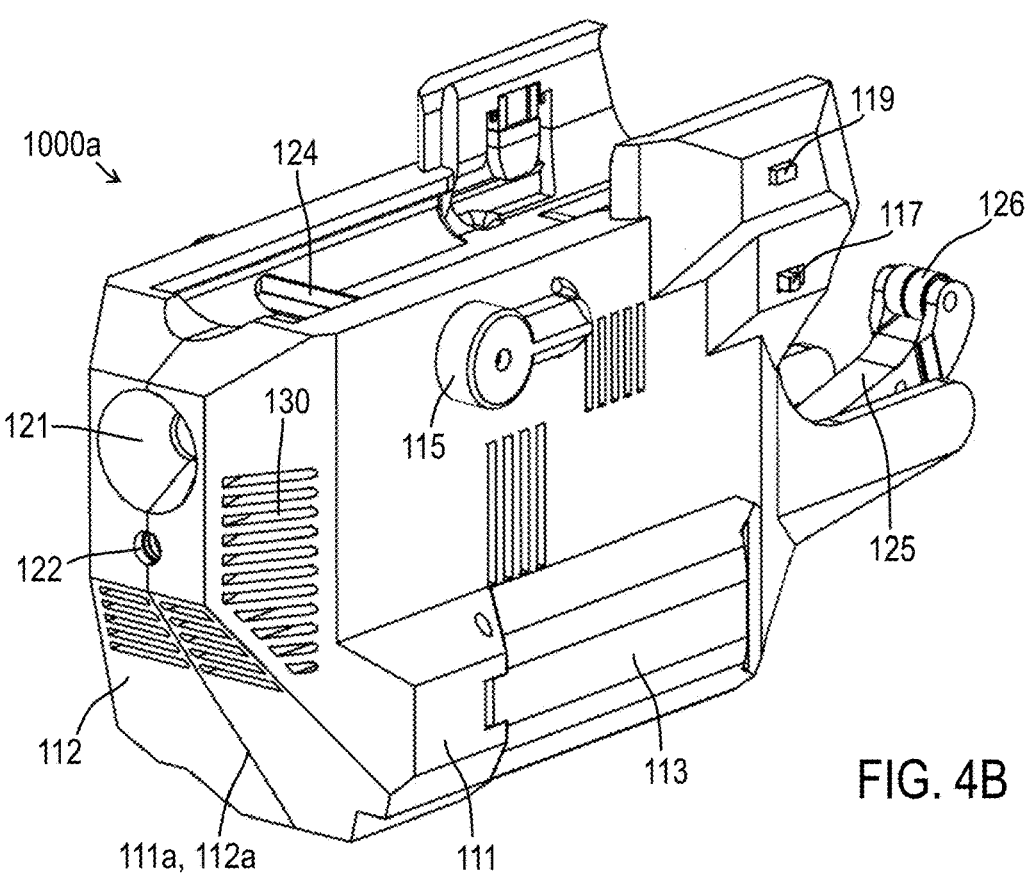
FIG. 4B is a left front perspective view of the threat assessment system of FIG. 2.
Figure 4C:
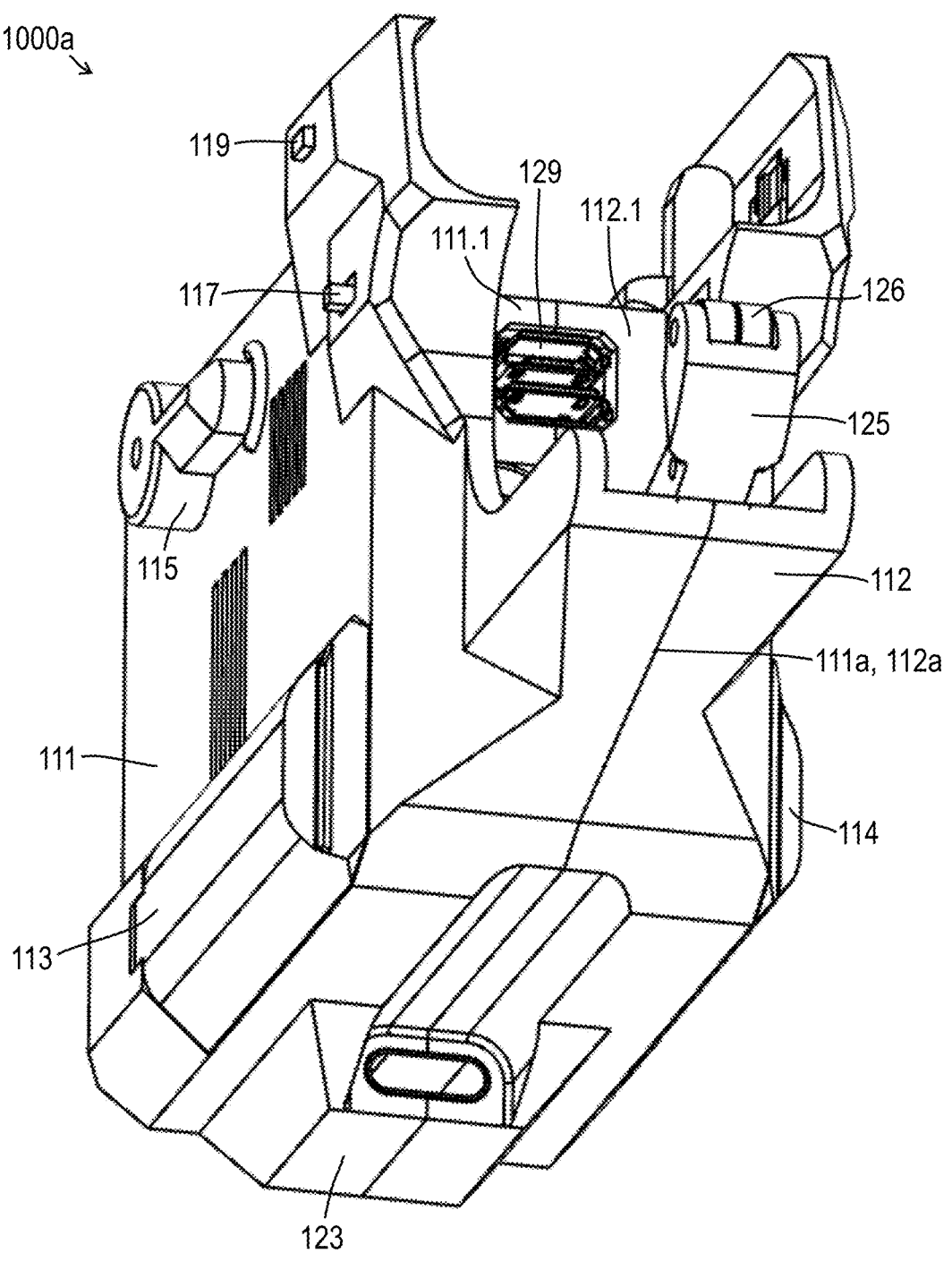
FIG. 4C is a left rear perspective view of the threat assessment system of FIG. 2.

The threat assessment system 1000a may be incorporated into a firearm (handguns, rifles, carbines, shotguns, etc.), a vehicle (patrol cars, tracked vehicles, armored fighting vehicles, armored personnel carriers, etc.), a manned fixed wing aircraft, a manned rotary wing aircraft (e.g., helicopter), an unmanned aerial vehicles (UAV), manned or unmanned maritime vehicles (including boats, submarines, hovercraft), satellites, detection dogs (typically used by law enforcement of the military), or any other appropriate object. In some embodiments, as shown in FIGS. 2-5C, the system 1000a may be arranged into a package small enough for a handgun. Although the illustrated embodiments shown in FIGS. 2 and 3 illustrate components of a firearm 10 as a handgun to show that the threat assessment system 1000a can be compact in a firearm context, the features, concepts, and functions described herein are also applicable (with potential necessary alterations for particular applications) to rifles, carbines, shotguns, bolt-action, lever-action, pump-action, or any other type of firearm. Furthermore, the embodiments may be compatible with various calibers including rifle calibers such as, for example, 5.56×45 mm NATO, 0.223 Remington, 7.62×51 mm NATO, 0.308 Winchester, 7.62×39 mm, 5.45×39 mm; pistol calibers such as, for example, 9×19 mm, 0.45 ACP, 0.40 S&W, 0.380 ACP, 10 mm Auto, 5.7×28 mm; and shotgun calibers such as, for example, 12 gauge, 20 gauge, 28 gauge, 0.410 gauge, 10 gauge, 16 gauge.

As shown in FIGS. 2 and 3, the threat assessment system 1000a may include a left side housing 111 and a right side housing 112 that are approximately symmetric with one another. In some embodiments, the left side housing 111 includes a center surface 111a and the right side housing 112 includes a center surface 112a where the center surfaces 111a, 112a meet at a centerline of the firearm 10 (see FIGS. 2-5B). The left side housing 111 may also include a inner protrusion 111.1 that extends inward to the center surface 111a and meets the inner protrusion 112.1 (of the right side housing 112) at the center surface 112a. A latch handle mechanism, which includes a left side handle 115, a right side handle 116, and a shaft 124, secures the threat assessment system 1000a onto a rail 14 of the firearm 10. As shown in FIG. 3, the left side handle 115 is located at the surface of the left side housing 111. Similarly, the right side handle 116 is located at the surface of the right side housing 112 (see FIG. 2). The system 1000a may also include a left side battery cover 113 that covers a first battery 131 and a right side battery cover 114 that covers a second battery 132 (see FIGS. 2-5C).

Figure 6A:
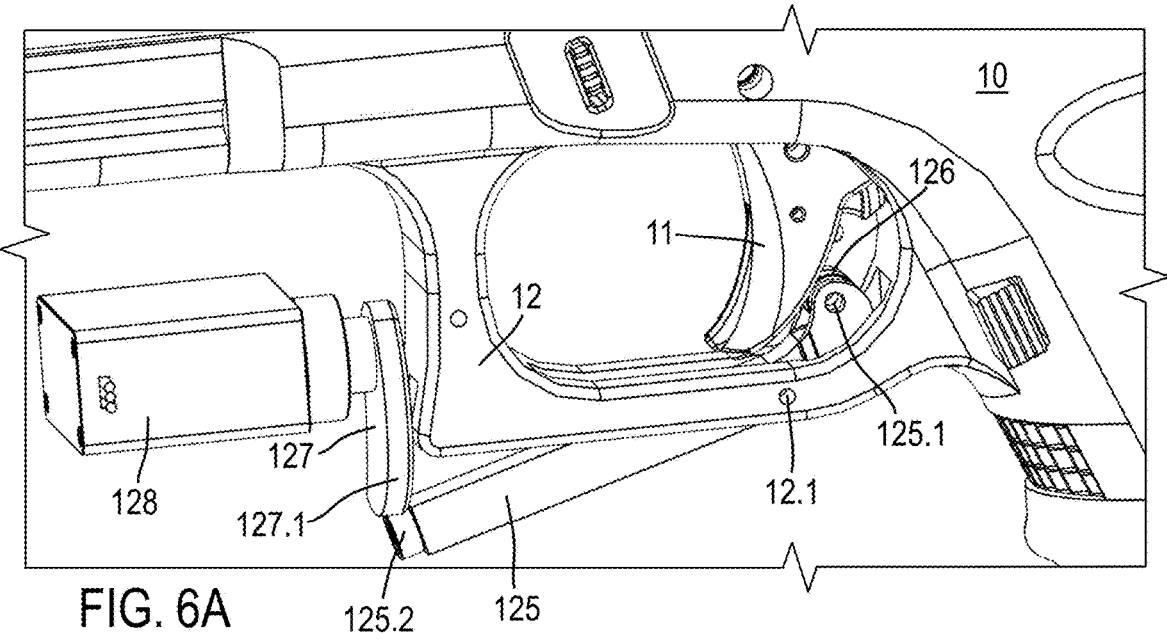
FIG. 6A is a left side partial perspective view of the firearm of FIG. 2.
Figure 6B:
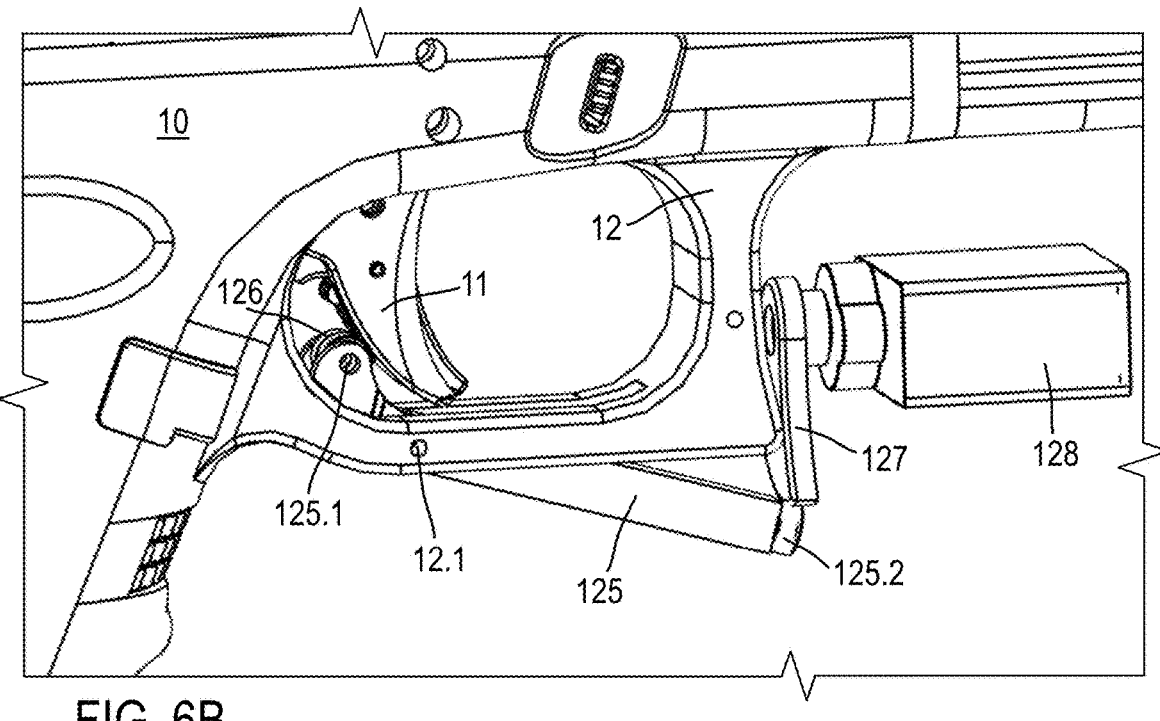
FIG. 6B is a right side partial perspective view of the firearm of FIG. 2.
Figure 6C:
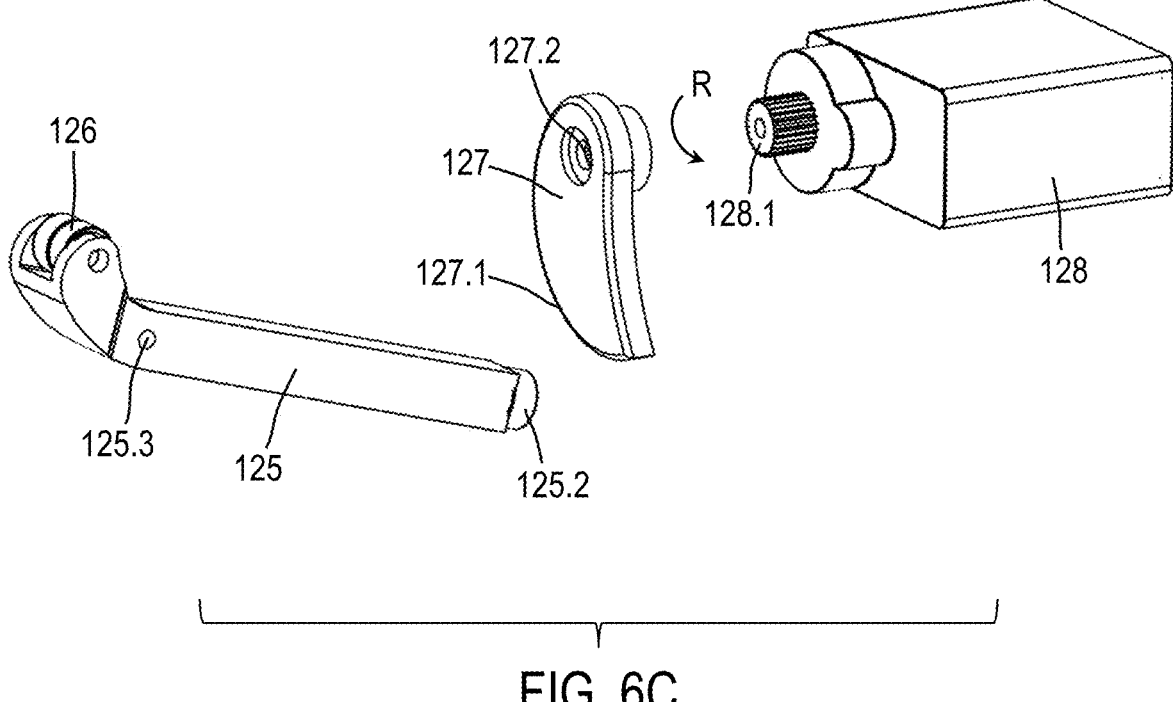
FIG. 6C is a right side partial exploded perspective view of the firearm of FIG. 2.
Figure 8:
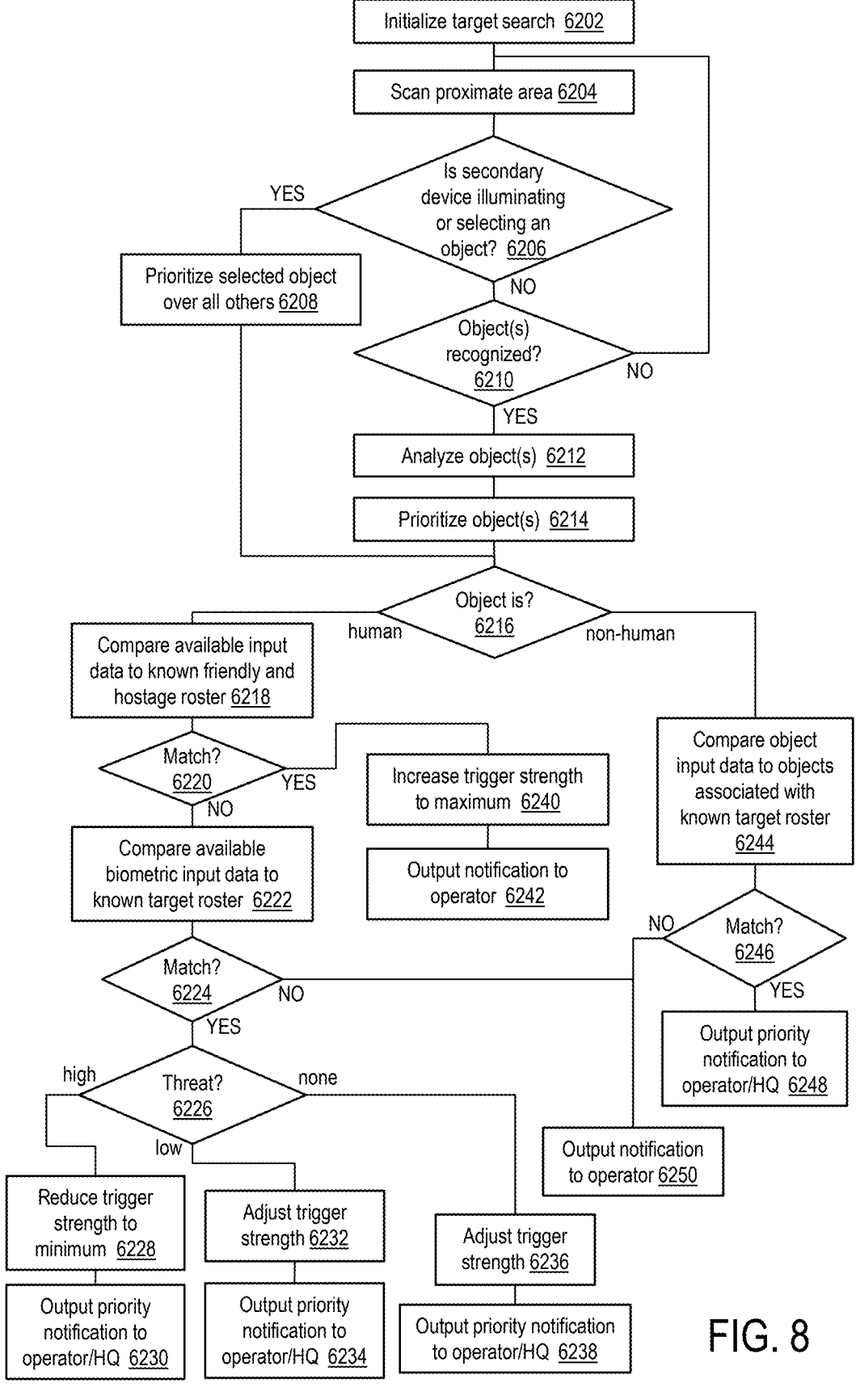
FIG. 8 is a flowchart for a target search for the threat assessment system of FIG. 1.
Figure 9:
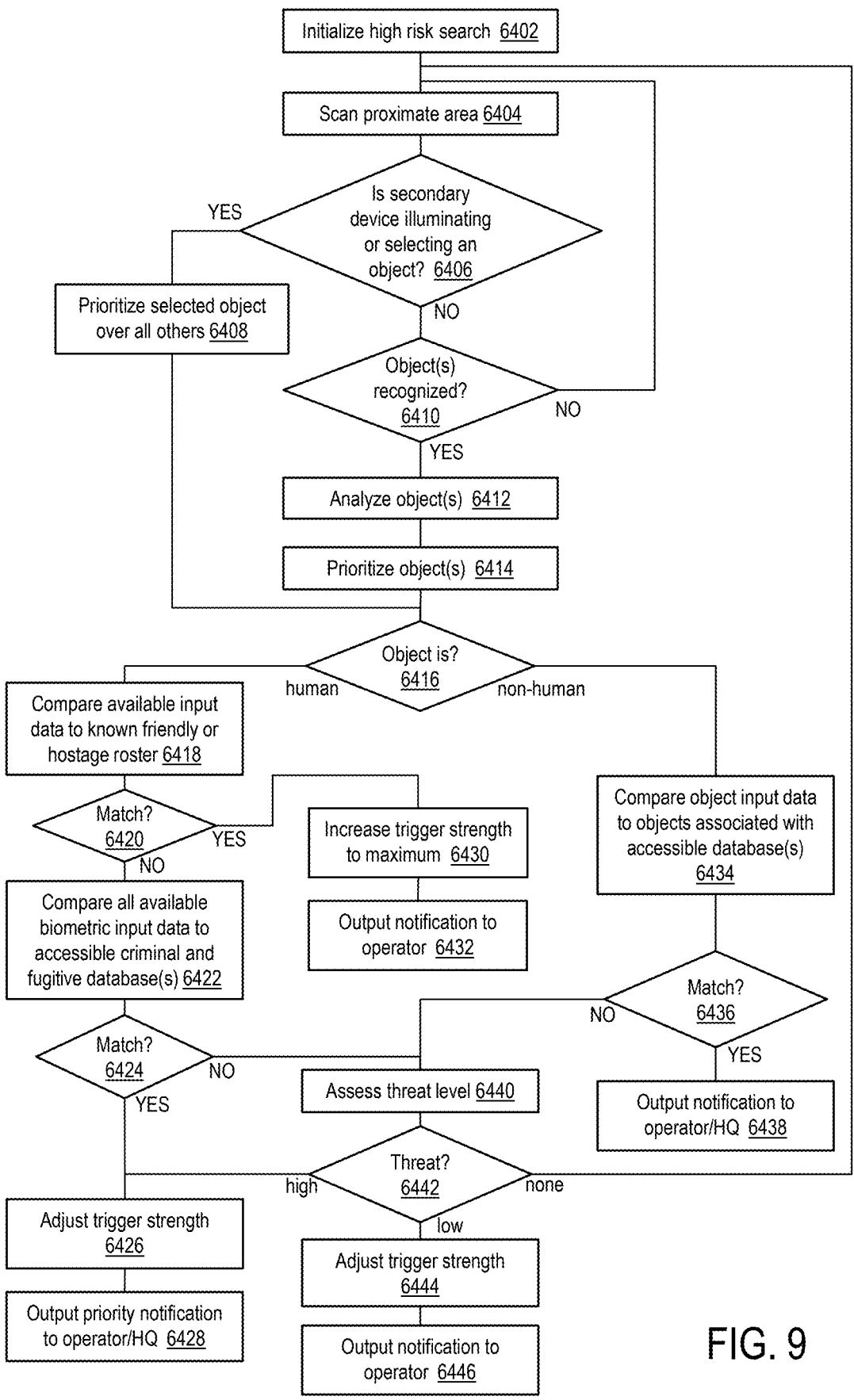
FIG. 9 is a flowchart for a high risk search for the threat assessment system of FIG. 1.
Figure 10:
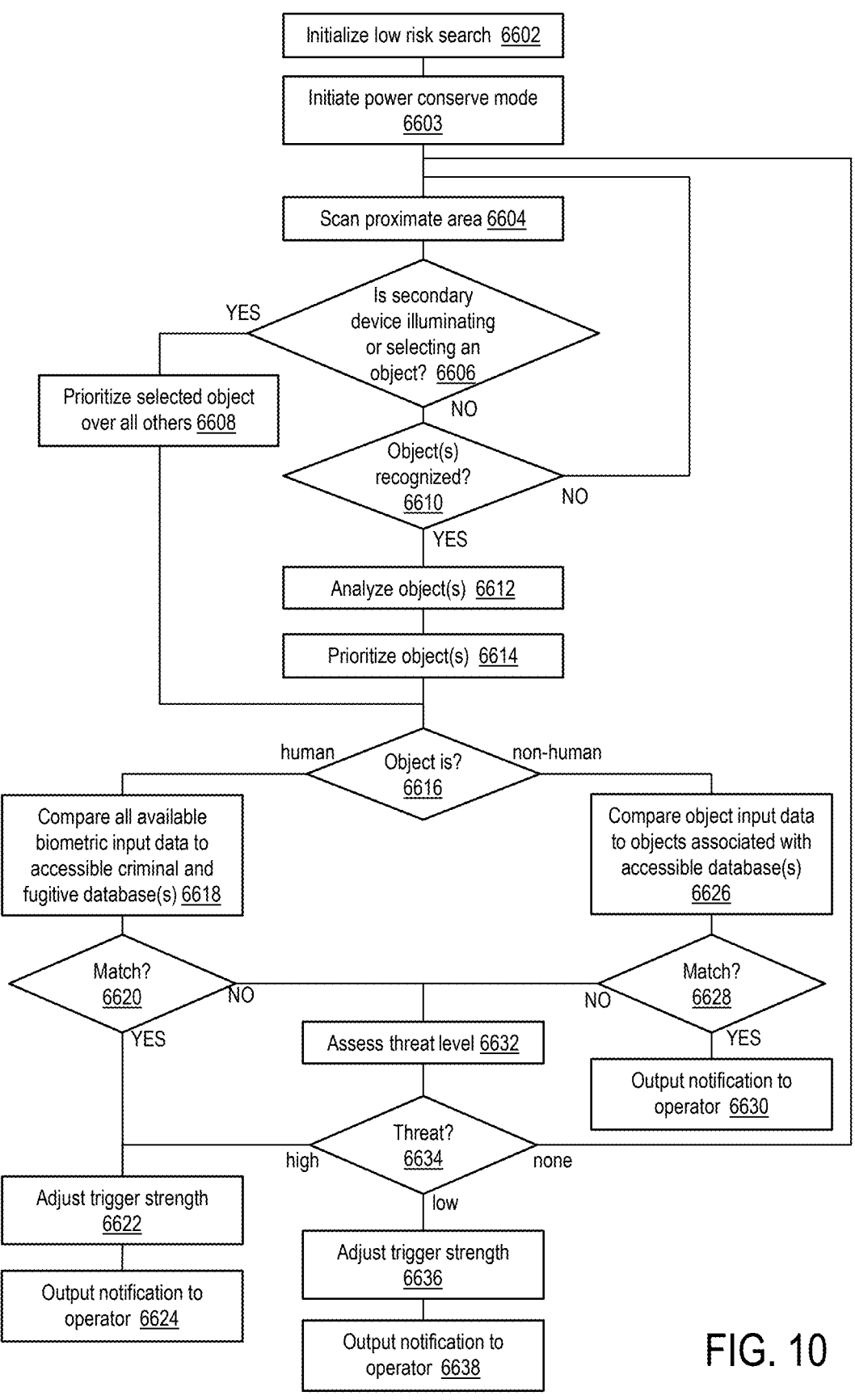
FIG. 10 is a flowchart for a high risk search for the threat assessment system of FIG. 1.

The threat assessment system 1000a may include a trigger strength adjustment mechanism that affects the force required to actuate trigger 11 of the firearm 10. In some embodiments, the trigger strength adjustment mechanism includes a trigger strength arm 125, a bearing 126, a trigger cam 127, and a trigger servo 128 (see FIGS. 5A-6C). The trigger servo 128 may receive input or signals from other parts of the threat assessment system 1000a (e.g., the computing device 101, the processor 310, and/or the I/O interface module 315) that causes the trigger servo 128 to move or rotate the trigger cam 127. In some embodiments, movement of the trigger cam 127 affects the trigger strength arm 125 and increases or decreases the force required to operate the trigger 11. The trigger strength adjustment mechanism may create additional resistance to increase the force/pressure required to actuate the trigger, may be adjusted to provide no additional force/pressure (i.e., the OEM factory trigger weight is unchanged), and/or may function to apply some force/pressure toward actuation to decrease the force/pressure required to actuate the trigger. The trigger strength arm 125 may include a front bearing 125.2 that interfaces with the trigger cam 127, a pivot hole 125.3, and a rear hole 125.1 that interfaces with bearing 126. In some embodiments, the trigger strength arm 125 pivots about pivot hole 125.3. The pivot hole 125.3 may be fixed to the trigger guard 12 at hole 12.1 (see FIGS. 6A-6C). When the operator applies pressure to the trigger 11, the bearing 126 is rotated and pressed downward and toward the rear of the firearm 10 which causes the trigger strength arm 125 to rotate about pivot hole 125.3 (hole 12.1 of the trigger guard 12). In other words, actuating the trigger 11 causes the rear hole 125.1 at the rear end of the trigger strength arm 125 to rotate downward (about pivot hole 125.3) and the front bearing 125.2 at the forward end of the trigger strength arm 125 to rotate upward. Upward movement of the forward end of the trigger strength arm 125 causes the front bearing 125.2 to slide and/or rotate along the cam surface 127.1 of the trigger cam 127. Due to the shape of the cam surface 127.1, upward pressure from the front bearing 125.2 causes the trigger cam 127 to rotate about hole 127.2, which engages the input/output shaft 128.1 of the trigger servo 128 (see rotation direction R shown in FIG. 6C). In some embodiments, the trigger servo 128 provides resistance for rotation of the input/output shaft 128.1. The resistance may be based on input from other parts of the threat assessment system 1000a (e.g., the computing device 101, the processor 310, and/or the I/O interface module 315). For example, as shown in FIG. 1, the trigger servo 128 may be connected to the I/O interface module 315. In some cases, the threat assessment system 1000a uses the artificial intelligence module 357 for adjusting the resistance of the trigger servo 128. FIGS. 8-10 illustrate examples where the resistance of the trigger servo 128 is adjusted (see at least steps 6226, 6230, 6426, 6430, 6444, 6622, and 6636). The system 1000a may be retrofit onto existing firearms such that the system 1000a can be implemented with an existing inventory of firearms for an organization (e.g., a law enforcement agency or military organization). In some embodiments, the system 1000a and/or the firearm 10 is structured such that trigger resistance is adjusted using internal components (e.g., a system of levers, springs, belts, servos, and/or other relevant components) that are not visible or exposed to the exterior of the firearm 10 (i.e., less susceptible to damage, degradation, or other potential problems). In other words, in some embodiments, the system 1000a is an integral portion and is designed into the firearm 10.

In some embodiments, the system 1000a can use data for at least one of the sensors (e.g., a combination of one or more cameras, microphones, or other sensors) to triangulate, echolocate, or otherwise define a location for object detected by the system 1000a. In other words, the system 1000a can define a location (for the individual operator and/or for central headquarters) of an identified human or non-human object.

The system 1000a may be configured with constant background analysis or detection portion that monitors for immediate threats. In some embodiments, the system 1000a includes another layer within the software and/or a component of the artificial intelligence module 357 that monitors for immediate threats and may act faster and/or may override other settings of the system 1000a. For example, the system 1000a may monitor input through the sensors 121, 130 and the detection of gunfire aimed toward the operator may cause the system to immediately update the trigger strength adjustment mechanism to reduce trigger strength. This procedure may include analysis and recognition of the type of weapon and ammunition including, for example, caliber, bullet weight, proximity/location, suppressed/unsuppressed, firearm action type (bolt action, semiauto, select fire, single shot, etc.), quantity/volume of fire, and/or other relevant factors.

FIGS. 7-10 illustrate some non-limiting embodiments of flowcharts describing some steps that the system 1000a may use when operating. In some examples, the system 1000a may determine whether activity is detected (see step 604) using one or more various inputs. The inputs may include at least one of motion detection, light input, thermal activity, biometric input, auditory or sound input, vibration, pressure input, and/or any other appropriate input.

As shown in step 606, although not required for all embodiments, the system 1000a may check for biometric input before continuing operation of the system 1000a (potentially a second biometric input if biometric input is used at step 604). The biometric input may be facial recognition, a fingerprint, an optical scan, retinal scan, voice recognition, a biochemical sensor, an electrocardiogram (ECG/EKG) sensor, gait recognition, and/or any appropriate sensor. The system 1000a may be inoperable without a specific biometric input and, in some cases, may prevent operation of the relevant device (e.g., a firearm 10, a vehicle, or any other relevant object). The system 1000a may be linked to and to allow access based on the biometric data of an individual user or a list of users (i.e., a list of known law enforcement officers) and/or may be capable of preventing operation based on the biometric data of known criminals or unauthorized users (e.g., underaged minors).

Figure 7:
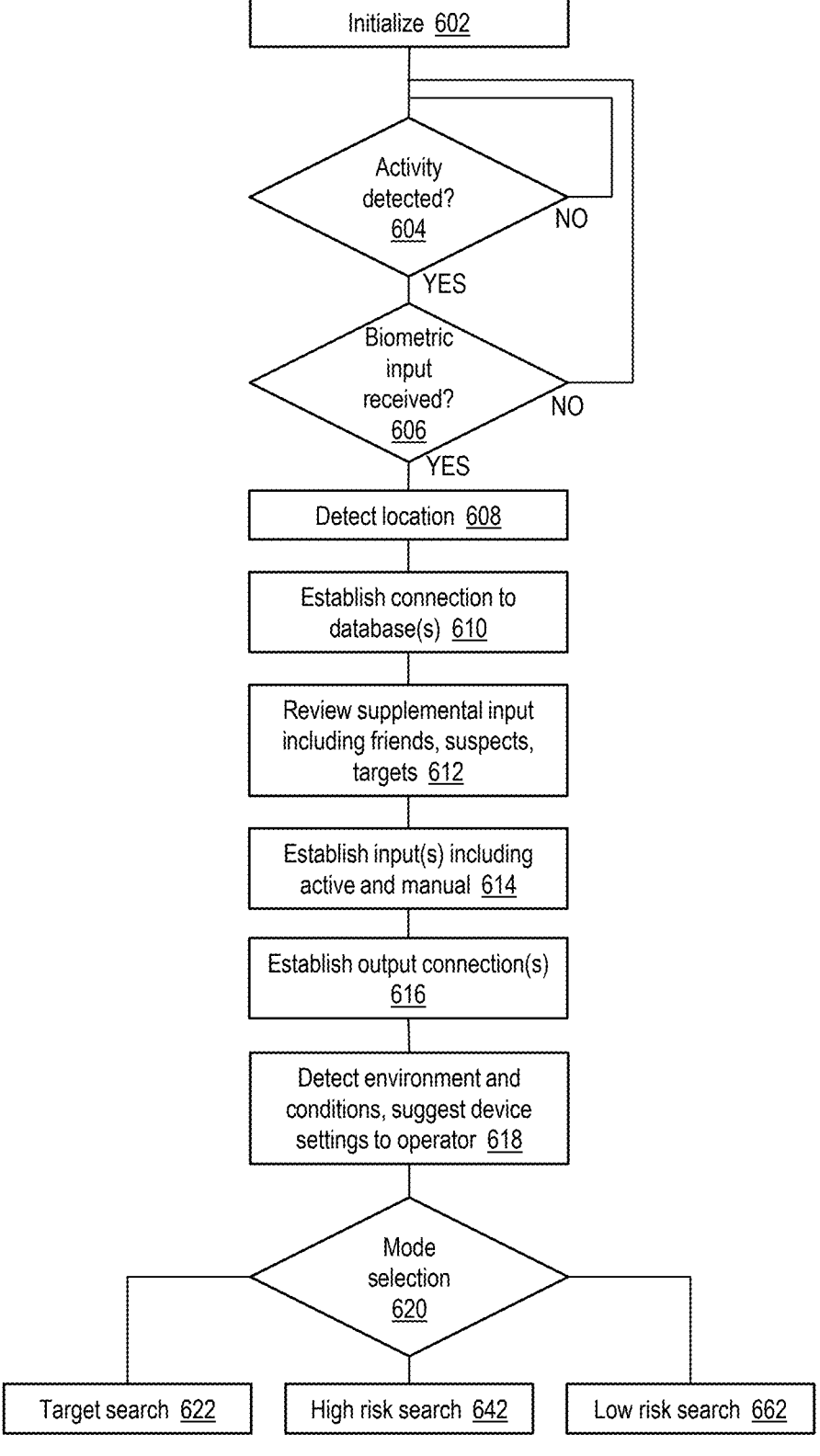
FIG. 7 is a flowchart for initial steps for the threat assessment system of FIG. 1.

In some embodiments, as shown in FIG. 7, the system 1000a may also include a step for determining location (see step 608) using a global positioning system (GPS), cellular data, WIFI information, or any other appropriate system. Based on the location information, the system 1000a may access a particular set or subset of databases. For example, if the system 1000a detects a different town, city, county, state, or country, the system 1000a may access more/different databases. In some embodiments, the system 1000a may have information stored in database(s) that is used to compare to objects and people recognized by the camera(s)

121. The comparison may include facial recognition, text recognition/comparison (signs, nametags, license plates, with automatic translation to/from various languages), and/or other appropriate analysis. The database(s) may include people (including criminals, informants, witnesses, law enforcement officers, and/or others), property (including stolen or missing property or objects affiliated with known criminals), or other relevant objects. The system 1000a may connect to at least one database (see step 610), which may include a connection to one or more external database(s) including a remote server, a cloud-based server, or any other remote source. In some cases, the system 1000a may also have local storage (local hard disk, solid state drive, etc.) for storing relevant data. The system 1000a may also be able to detect real-time changes and updates to the database, which may be local for a municipality, city, state, or federal level.

The system 1000a may allow an operator to add supplemental information through a manual input, through connection to specific database(s), and/or through any other type of input (see step 612). The supplemental information may include information about friendly entities (such as other law enforcement) so the system 1000a can aid the operator in preventing friendly fire. For example, if operator will be interacting or potentially encountering federal law enforcement not typical for the jurisdiction (e.g., due to a new investigation or presence of a new suspect), the system 1000a can be updated to recognize a roster of federal law enforcement personnel. The supplemental information may also include information about suspects, which can be updated in real time to include names, descriptions, biometric data, clothing, information about associated objects (vehicles, weapons, etc.), and/or any other relevant information. In addition, the supplemental information may also include information about specific targets including hostages, known suspects, terrorists, high-value individuals, high-payoff targets, high-value targets, or any other appropriate person or object. The supplemental information may be short term and/or task-specific. For example, the operator may be searching for a specific person or target, which can be specified in the system 1000a (based on facial structure, voice profile, or other information). Other information may include at least one of a vehicle (including a license plate), a weapon, clothing, scars, tattoos, known associates, or any other relevant information. The supplemental information may also include information relevant to friendly entities (such as specific law enforcement officers or other third parties including witnesses and informants). The system 1000a can be configured to identify friendly entities based on facial structure, voice profile, or known friendly entities may wear a specifically reflective patch, quick response code, or material that the system 1000a can quickly recognize.

As shown in FIG. 7, in step 614, the system 1000a may be configured to establish at least one input connection. The input(s) may include the camera(s) 121, the microphone(s) 130, and/or any other appropriate device. In some examples, the camera(s) 121 are at least one of a regular camera, a night-vision camera, a thermal imaging camera, an infrared camera, forward-looking infrared (FLIR), or any other appropriate device. The inputs may also work in conjunction with other parts of the device. For example, the system 1000a may include a secondary device(s) 122 that may include at least one of a flashlight, a laser, an infrared laser or light emitter, an ultraviolet light emitter, and/or any other appropriate device. If the secondary device(s) 122 include a laser, the secondary device(s) 122 may product visible light and/or may produce infrared (IR) light that is not visible to a human eye. However, the IR light will be visible to certain cameras, such as night vision. Accordingly, the operator may point the secondary device(s) 122 (incorporating an IR light) at a subject (person or object) to select or paint the subject (without the using light that is visible to a human eye). As shown in FIGS. 8-10, the system 1000a may be capable of recognizing a selected object identified by the secondary device(s) 122 (see at least steps 6206-6208, 6406-6408, and 6606-6608).

Establishment of at least one output connection may occur at step 616. As described above, the output(s) may include at least one of the auditory output module 317, the visual output module 318, the haptic output module 319, and/or various other appropriate output device(s). The system 1000a may be configured to output information, not only to the operator, but also remotely transmitted to a team leader (who may be operating nearby, located remotely in a headquarters, or in any other appropriate location). In addition, the system 1000a may be configured to output information to a central repository (which may occur in parallel with systems in use by other operators) so the data can be analyzed and evaluated on a large scale (e.g., using artificial intelligence). In some cases, the outputting of information is automatic as a backup if the operator is incapacitated and unable to relay information.

As shown in step 618, the system 1000a may detect at least one environmental condition and, in some conditions, may provide recommendations to the operator. For example, the system 1000a may detect the amount of ambient light due to time of day, weather conditions (including fog, haze, dust, etc.), or other relevant factors before suggesting a configuration for the camera(s) 121 and/or the secondary device(s) 122. Based on input from the operator, information received from local/remote database(s), and other relevant sources, the system may also provide recommendations for mode selection (see steps 620, 622, 642, 662). The available modes may include a target search 622, a high risk search 642, a low risk search 662, or any other appropriate search. In addition to input received from the operator and information received from local/remote database(s), relevant information to mode selection may include amber alerts, information/intelligence related to terrorists or high-value individuals believed to be in close proximity, local organized crime or gang intelligence, information shared from other nearby similar systems (e.g., 1000b, 1000c, 1000d, . . . 1000N), or any other relevant factor. In some embodiments, an operator can spontaneously create a new type of search with customized parameters.

FIG. 8 illustrates one embodiment of the target search 622. In some embodiments, the operator selects the target search 622 when he/she is tasked with searching for a specific target, which may include a terrorist (or group of terrorists), a witness or person of interest in an investigation (or group of witnesses/persons of interest), suspect(s) in a criminal investigation, hostage(s), any person of interest, an aminate or inanimate object, and/or any combination thereof. After initializing the search (step 6202), the first step is scanning the proximate area in step 6204. The scanning step 6204 may include collecting and initial analysis of data from the various inputs (including data from sensors 121, 130, among others). The input data may come from at least one camera, at least one microphone, and/or any other appropriate source. The system 1000a may detect and/or identify any number of objects in step 6204 (including zero objects or as many as thousands or millions of objects).

The next step in the target search 622 is to check whether the secondary device(s) 122 are selecting or illuminating an object (step 6206). As described above, the operator may use the secondary device(s) 122 to select or illuminate at least one object, and the system 1000a determines whether any object is selected at step 6206. If no object is selected, the system 1000a moves to step 6210 where the system determines whether any objects are recognized. Conversely, if there is at least one object selected at step 6206, the system 1000a moves to step 6208 where the selected object(s) are prioritized over all other objects. In step 6210 (assuming no object is selected at step 6206), the system 1000a uses data from the various inputs (including data from sensors 121, 130, among others) to determine whether any objects are recognized. In some embodiments, step 6210 includes artificial intelligence to compare data (including, for example, images and sound) using various algorithms. The algorithms may include reverse images searches, neural network based image analysis and interpretation, and other analyses based on constantly expanding databases of information used for comparison and machine learning. As shown in FIG. 8, the system 1000a has two options upon reaching step 6210 that include (i) affirmation that at least one object is recognized and (ii) determination that no objects are recognized. If no objects are recognized at step 6210, the system 1000a returns to scanning step 6204. If there is at least one object recognized at step 6210, the system 1000a proceeds to step 6212 where the recognized object(s) are analyzed and step 6214 where the object(s) are prioritized. Although the target search 622 is illustrated where a selection of an object with the secondary device(s) 122 causes the system 1000a to bypass the analysis and prioritization steps (6212, 6214), the system 1000a may configured to include one or both of these steps in situations where the secondary device(s) 122 are used to select at least one object. The analysis and prioritization steps (6212, 6214) may include analysis based on artificial intelligence, image recognition, audio analysis (including, for example, speech/voice recognition), and other algorithms (as described above) and ensures that the system 1000a allocates resources to the most critical object(s). In some embodiments, the system 1000a prioritizes objects/people that pose the greatest threat and/or are most dangerous, objects with the greatest potential for intelligence gathering (written documents, computers, maps, etc.), and/or any other appropriate quality. For example, if the system 1000a identifies three people where one is armed with a firearm, the system 1000a will prioritize the armed person for further analysis. In some cases, the system 1000a may prioritize an object identified as a potential explosive including, for example, a vest worn by a person identified or an object identified as a potential improvised explosive device (IED). The prioritization may dictate that the prioritized object is analyzed separately before other detected object(s) while, in other embodiments, multiple objects are analyzed in parallel but the prioritized object receives greater resources and priority for reporting to the operator and/or headquarters.

Step 6216 occurs after the identified object(s) are prioritized (after step 6208 and/or step 6214 as described above). In step 6216, the system 1000a determines whether the identified object(s) are human or non-human. As shown in FIG. 8, object(s) identified as human proceed to step 6218 for analysis and object(s) identified as non-human proceed to step 6244 for analysis.

Non-human object analysis begins at step 6244 where the object is compared to a database(s) of objects compiled for known targets, where the object may be matched to a target and/or to an object affiliated with a target. In some cases, the system 1000a has previously identified and/or categorized the object (e.g., see step 6212) while there may be further analysis at step 6244 (in addition to comparisons to databases). Step 6246 is where system 1000a determines whether the non-human object matches any object in the database(s). If the non-human object does match an object in a database, the system 1000a moves to step 6248 where a notification is sent to the operator and/or a central database (e.g., a headquarters). If the non-human object does not match any object in a database, the system 1000a moves to step 6250 where a notification is sent to the operator and/or a central database (e.g., a headquarters). In some embodiments, the notification at step 6248 is sent with a higher priority compared to step 6250. In other words, the system 1000a is organized to provide a clear and conspicuous message to the operator (and/or centralized organization) that an object relevant to a target has been identified. The system 1000a may be arranged such that the notification at step 6250 is minimal (i.e., particularly if there is a large volume of objects being scanned where most result in step 6250). FIG. 8 shows that human and non-human evaluations for the target database that result in a negative answer each lead to step 6250 (i.e., both step 6246 and step 6224). However, in some embodiments, there is a separate/distinct notification for the human evaluation and the non-human evaluation. For example, a negative response from step 6246 may lead to a notification specific to non-human objects while a negative response from step 6224 may lead to a notification specific to human objects. In addition, human and non-human evaluations for the target database that result in a negative answer are each shown as leading directly to a notification at step 6250. However, in some cases, the system 1000a may evaluate the threat level of the object (even if not a match for a known target) before providing a notification—for example, see steps 6440 and 6442 in FIG. 9.

Human object analysis begins at step 6218 where the human is compared to database(s) of friends, allies, hostages, and/or other people that the system 1000a dictates should not be subject to a use of force (collectively "friendlys"). The data collected for this analysis may include biometric data including, for example, facial scans (for facial recognition), fingerprint data, optical scan(s), retinal scan(s), voice recognition, biochemical data, electrocardiogram (ECG/EKG) data, gait recognition, and/or any other appropriate data. The data may also include non-biometric data that can aid in recognizing individuals, including tattoos, scars, clothing, hairstyles, and/or any other appropriate data. Step 6220 is where system 1000a determines whether the human object matches any object in the database(s) of friendlys. In some embodiments, if the human object does match an object in the database(s) of friendlys, the system 1000a moves to step 6240 where the trigger resistance is increased (e.g., using trigger strength arm 125 and trigger servo 128, as described above). The trigger strength (i.e., the force require to actuate the trigger) may be increased to a maximum in step 6240 to reduce the likelihood that an operator will harm a friendly. Step 6242 includes a notification that is sent to the operator and/or a central database (e.g., a headquarters). In some embodiments, the notification at step 6242 is sent with a high priority for all objects that match at least one friendly while, in other embodiments, the notification is sent with high priority for a friendly that matches a friendly classified as a hostage, a high-value non-combatant, or any other appropriate person.

When the human object does not match an object in the database(s) of friendlys at step 6220, the system 1000a moves to step 6222 where the human is compared to database(s) of targets, known suspects, terrorists, high-value individuals, high-payoff targets, high-value targets, and/or other people that the system 1000a designates as a target (collectively "targets"). The data collected for this analysis may include biometric data including, for example, facial scans (for facial recognition), fingerprint data, optical scan(s), retinal scan(s), voice recognition, biochemical data, electrocardiogram (ECG/EKG) data, gait recognition, and/or any other appropriate data. The data may also include non-biometric data that can aid in recognizing individuals, including tattoos, scars, clothing, hairstyles, and/or any other appropriate data. Step 6224 is where system 1000a determines whether the human object matches any object in the database(s) of targets. In some embodiments, if the human object does not match an object in the database(s) of targets, the system 1000a moves to step 6250 where a notification is sent to the operator and/or a central database (e.g., a headquarters). As described above, FIG. 8 shows that human and non-human evaluations for the target database that result in a negative answer each lead to step 6250 (i.e., from both step 6246 and step 6224). However, in some embodiments, there is a separate/distinct notification for the human evaluation and the non-human evaluation.

If the human object does match an object in the database(s) of targets at step 6224, the system 1000a moves to step 6226 where a threat level of the human object is assessed. In some embodiments, as shown in FIG. 8, the system 1000a classifies all human objects in step 6226 into one of three threat levels: high, low, and none. However, in other embodiments, step 6226 may have any number of threat levels including two (yes or no), four (high, medium, low, none), or any appropriate number of threat levels. If the human object is classified as a high threat level (e.g., a weapon is aimed at the operator and/or at a hostage), the system 1000a moves to step 6228 where the trigger resistance is decreased (e.g., using trigger strength arm 125 and trigger servo 128, as described above). The trigger strength (i.e., the force require to actuate the trigger) may be decreased to a minimum in step 6228 to reduce the likelihood that an operator (and/or an innocent bystander) will be harmed by the human object. In some cases, the reduction of the trigger resistance at step 6228 may decrease the operator's reaction time (i.e., help the operator react faster to a threat). If the human object is classified as a low threat level (e.g., a weapon is within reach of the human object), the system 1000a moves to step 6232 where the trigger resistance is adjusted (e.g., using trigger strength arm 125 and trigger servo 128, as described above). The trigger strength (i.e., the force require to actuate the trigger) may be adjusted to a moderate level in step 6232 to reduce the likelihood that an operator (and/or an innocent bystander) will be harmed by the human object. In some cases, the reduction of the trigger resistance at step 6232 may decrease the operator's reaction time (i.e., help the operator react faster to a threat). If the human object is classified as none or zero threat level, the system 1000a moves to step 6236 where the trigger resistance is adjusted (e.g., using trigger strength arm 125 and trigger servo 128, as described above). The trigger strength (i.e., the force require to actuate the trigger) may be adjusted to a relatively high level in step 6236 to reduce the likelihood that a potential source of intelligence (and/or an innocent bystander) will be harmed.

Although not explicitly shown in FIG. 8, each time the system 1000a reaches a step where a notification is executed (e.g., see steps 6230, 6234, 6238, 6242, 6248, 6250, etc.) the target search 622 may loop back to step 6204. The target search 622 may be configured to analyze a plurality of objects simultaneously in parallel with one another. In some embodiments, the system 1000a is designed to cycle from step 6204 to one of the notification steps (e.g., see steps 6230, 6234, 6238, 6242, 6248, 6250, etc.) multiple times per second (in some cases, as fast as thousands of times per second).

FIG. 9 illustrates one embodiment of the high risk search 642. In some embodiments, the operator selects the high risk search 642 when he/she is tasked with patrolling a dangerous area, an area where violence is common, or any other relevant situation. In some embodiments, the high risk search 642 is the default mode for operating the system 1000a. After initializing the search (step 6402), the first step is scanning the proximate area in step 6404. The scanning step 6404 may include collecting and initial analysis of data from the various inputs (including data from sensors 121, 130, among others). The input data may come from at least one camera, at least one microphone, and/or any other appropriate source. The system 1000a may detect and/or identify any number of objects in step 6404 (including zero objects or as many as thousands of objects).

The next step in the high risk search 642 is to check whether the secondary device(s) 122 are selecting or illuminating an object (step 6406). As described above, the operator may use the secondary device(s) 122 to select or illuminate at least one object, and the system 1000a determines whether any object is selected at step 6406. If no object is selected, the system 1000a moves to step 6410 where the system determines whether any objects are recognized. Conversely, if there is at least one object selected at step 6406, the system 1000a moves to step 6408 where the selected object(s) are prioritized over all other objects. In step 6410 (assuming no object is selected at step 6406), the system 1000a uses data from the various inputs (including data from sensors 121, 130, among others) to determine whether any objects are recognized. In some embodiments, step 6410 includes artificial intelligence to compare data (including, for example, images and sound) using various algorithms. The algorithms may include reverse images searches, neural network based image analysis and interpretation, and other analyses based on constantly expanding databases of information used for comparison and machine learning. As shown in FIG. 9, the system 1000a has two options upon reaching step 6410 that include (i) affirmation that at least one object is recognized and (ii) determination that no objects are recognized. If no objects are recognized at step 6410, the system 1000a returns to scanning step 6404. If there is at least one object recognized at step 6410, the system 1000a proceeds to step 6412 where the recognized object(s) are analyzed and step 6414 where the object(s) are prioritized. Although the high risk search 642 is illustrated where a selection of an object with the secondary device(s) 122 causes the system 1000a to bypass the analysis and prioritization steps (6412, 6414), the system 1000a may configured to include one or both of these steps in situations where the secondary device(s) 122 are used to select at least one object. The analysis and prioritization steps (6412, 6414) may include analysis based on artificial intelligence, image recognition, audio analysis (including, for example, speech/voice recognition), and other algorithms (as described above) and ensures that the system 1000a allocates resources to the most critical object(s). In some embodiments, the system 1000a prioritizes objects/people that pose the greatest threat and/or are most dangerous, objects with the greatest potential for intelligence gathering (written documents, computers, maps, etc.), and/or any other appropriate quality. For example, if the system 1000a identifies three people where one is armed with a firearm, the system 1000a will prioritize the armed person for further analysis. In some cases, the system 1000a may prioritize an object identified as a potential explosive including, for example, a vest worn by a person identified or an object identified as a potential improvised explosive device (IED). The prioritization may dictate that the prioritized object is analyzed separately before other detected object(s) while, in other embodiments, multiple objects are analyzed in parallel but the prioritized object receives greater resources and priority for reporting to the operator and/or headquarters.

Step 6416 occurs after the identified object(s) are prioritized (after step 6408 and/or step 6414 as described above). In step 6416, the system 1000a determines whether the identified object(s) are human or non-human. As shown in FIG. 9, object(s) identified as human proceed to step 6418 for analysis and object(s) identified as non-human proceed to step 6434 for analysis.

Non-human object analysis begins at step 6434 where the object is compared to a database(s) of objects compiled for known criminals, fugitives, terrorists, and/or other individuals (collectively high risk individuals), where the object may be matched to a high risk individual and/or to an object affiliated with a high risk individual. In some cases, the system 1000a has previously identified and/or categorized the object (e.g., see step 6412) while there may be further analysis at step 6434 (in addition to comparisons to databases). Step 6436 is where system 1000a determines whether the non-human object matches any object in the database(s). If the non-human object does match at least one object in a database, the system 1000a moves to step 6438 where a notification is sent to the operator and/or a central database (e.g., a headquarters). If the non-human object does not match an object in the database(s), the system 1000a moves to step 6440 where a threat level of the object is assessed. In some embodiments, as shown in FIG. 9, the system 1000a assesses all human and non-human objects (that do not match databases for friendlys, high risk individuals, or objects associated with high risk individuals) in step 6440 (i.e., all negative results from steps 6424 and 6436 lead to step 6440). In some embodiments, although not shown in FIG. 9, human objects have a separate and distinct set of threat assessment and evaluation steps (e.g., see steps 6440, 6442) from those for non-human objects. After assessment, in step 6442 the system 1000a classifies the object(s) into one of three threat levels: high, low, and none. However, in other embodiments, step 6442 may have any number of threat levels including two (yes or no), four (high, medium, low, none), or any appropriate number of threat levels. If the object is classified as a high threat level (e.g., a weapon is aimed at the operator and/or at a hostage), the system 1000a moves to step 6426 where the trigger resistance is decreased (e.g., using trigger strength arm 125 and trigger servo 128, as described above). The trigger strength (i.e., the force require to actuate the trigger) may be decreased to a minimum in step 6426 to reduce the likelihood that an operator (and/or an innocent bystander) will be harmed by the object. In some cases, the reduction of the trigger resistance at step 6426 may decrease the operator's reaction time (i.e., help the operator react faster to a threat). If the object is classified as a low threat level (e.g., a weapon is nearby and/or within reach of the object), the system 1000a moves to step 6444 where the trigger resistance is adjusted (e.g., using trigger strength arm 125 and trigger servo 128, as described above). The trigger strength (i.e., the force require to actuate the trigger) may be adjusted to a moderate level in step 6444 to reduce the likelihood that an operator (and/or an innocent bystander) will be harmed by the object. In some cases, the reduction of the trigger resistance at step 6444 may decrease the operator's reaction time (i.e., help the operator react faster to a threat). If the object is classified as none or zero threat level at step 6442, the system 1000a returns to step 6404.

Human object analysis begins at step 6418 where the human is compared to database(s) of friends, allies, hostages, and/or other people that the system 1000a dictates should not be subject to a use of force (collectively "friendlys"). The data collected for this analysis may include biometric data including, for example, facial scans (for facial recognition), fingerprint data, optical scan(s), retinal scan(s), voice recognition, biochemical data, electrocardiogram (ECG/EKG) data, gait recognition, and/or any other appropriate data. The data may also include non-biometric data that can aid in recognizing individuals, including tattoos, scars, clothing, hairstyles, and/or any other appropriate data. Step 6420 is where system 1000a determines whether the human object matches any object in the database(s) of friendlys. In some embodiments, if the human object does match an object in the database(s) of friendlys, the system 1000a moves to step 6430 where the trigger resistance is increased (e.g., using trigger strength arm 125 and trigger servo 128, as described above). The trigger strength (i.e., the force require to actuate the trigger) may be increased to a maximum in step 6430 to reduce the likelihood that an operator will harm a friendly. Step 6432 includes a notification that is sent to the operator and/or a central database (e.g., a headquarters). In some embodiments, the notification at step 6432 is sent with a high priority for all objects that match at least one friendly while, in other embodiments, the notification is sent with high priority for a friendly that matches a friendly classified as a hostage, a high-value non-combatant, or any other appropriate person.

When the human object does not match an object in the database(s) of friendlys at step 6420, the system 1000a moves to step 6422 where the human is compared to database(s) of high risk individuals. The data collected for this analysis may include biometric data including, for example, facial scans (for facial recognition), fingerprint data, optical scan(s), retinal scan(s), voice recognition, biochemical data, electrocardiogram (ECG/EKG) data, gait recognition, and/or any other appropriate data. The data may also include non-biometric data that can aid in recognizing individuals, including tattoos, scars, clothing, hairstyles, and/or any other appropriate data. Step 6424 is where system 1000a determines whether the human object matches any object in the database(s) of high risk individuals. In some embodiments, if the human object does not match an object in the database(s) of high risk individuals, the system 1000a moves to step 6440 where a threat level of the object is assessed (see description above related to steps 6440, 6442, and related outcomes).

If the human object does match an object in the database(s) of high risk individuals at step 6424, the system 1000a moves to step 6426 where the trigger resistance is decreased (e.g., using trigger strength arm 125 and trigger servo 128, as described above). The trigger strength (i.e., the force require to actuate the trigger) may be decreased to a minimum in step 6426 to reduce the likelihood that an operator (and/or an innocent bystander) will be harmed by the human object. In some cases, the reduction of the trigger resistance at step 6426 may decrease the operator's reaction time (i.e., help the operator react faster to a threat). As shown in FIG. 9, in some cases, a high threat level at step 6442 and an affirmative outcome from step 6424 may both lead to the trigger adjustment at step 6426. However, in other embodiments, there may be separate and distinct outcomes for the high threat level at step 6442 and the affirmative outcome from step 6424. For example, each of these outcomes may lead to a separate and distinct trigger adjustment step and notification (similar to steps 6426, 6428) where the trigger adjustment and notification are customized for the threat level detected and/or the high risk individual identified.

In some embodiments, the notification at step 6428 is sent with a higher priority compared to other notifications for the high risk search 642 (i.e., steps 6432, 6438, 6446). In other words, the system 1000a is organized to provide a clear and conspicuous message to the operator (and/or centralized organization) that a high risk individual and/or a high threat level has been identified. The system 1000a may be arranged such that the notification at step 6446 is minimal (i.e., particularly if there is a large volume of objects being scanned where most result in step 6446). In some cases, the notification at step 6438 (indicating an object relevant to a high risk individual) is sent with higher priority than a notification at step 6446.

Although not explicitly shown in FIG. 9, each time the system 1000a reaches a step where a notification is executed (e.g., see steps 6428, 6432, 6438, 6446, etc.) the high risk search 642 may loop back to step 6404. The high risk search 642 may be configured to analyze a plurality of objects simultaneously in parallel with one another. In some embodiments, the system 1000a is designed to cycle from step 6404 to one of the notification steps (e.g., see steps 6428, 6432, 6438, 6446, etc.) multiple times per second (in some cases, as fast as thousands of times per second).

FIG. 10 illustrates one embodiment of the low risk search 662. In some embodiments, the operator selects the low risk search 662 when he/she is tasked with patrolling a relatively safe area, an area where violence is less common (compared to areas appropriate for the high risk search 642 described above), or any other relevant situation. In some embodiments, the low risk search 662 is power saving mode for operating the system 1000a when the operator wants to conserve battery power or when the available battery power is limited. After initializing the search (step 6602) and initiating a power conserve mode (step 6603), the first step is scanning the proximate area in step 6604. The scanning step 6604 may include collecting and initial analysis of data from the various inputs (including data from sensors 121, 130, among others). The input data may come from at least one camera, at least one microphone, and/or any other appropriate source. The system 1000a may detect and/or identify any number of objects in step 6604 (including zero objects or as many as thousands of objects).

The next step in the low risk search 662 is to check whether the secondary device(s) 122 are selecting or illuminating an object (step 6606). As described above, the operator may use the secondary device(s) 122 to select or illuminate at least one object, and the system 1000a determines whether any object is selected at step 6606. If no object is selected, the system 1000a moves to step 6610 where the system determines whether any objects are recognized. Conversely, if there is at least one object selected at step 6606, the system 1000a moves to step 6608 where the selected object(s) are prioritized over all other objects. In step 6610 (assuming no object is selected at step 6606), the system 1000a uses data from the various inputs (including data from sensors 121, 130, among others) to determine whether any objects are recognized. In some embodiments, step 6610 includes artificial intelligence to compare data (including, for example, images and sound) using various algorithms. The algorithms may include reverse images searches, neural network based image analysis and interpretation, and other analyses based on constantly expanding databases of information used for comparison and machine learning. As shown in FIG. 10, the system 1000a has two options upon reaching step 6610 that include (i) affirmation that at least one object is recognized and (ii) determination that no objects are recognized. If no objects are recognized at step 6610, the system 1000a returns to scanning step 6604. If there is at least one object recognized at step 6610, the system 1000a proceeds to step 6612 where the recognized object(s) are analyzed and step 6614 where the object(s) are prioritized. Although the low risk search 662 is illustrated where a selection of an object with the secondary device(s) 122 causes the system 1000a to bypass the analysis and prioritization steps (6612, 6614), the system 1000a may configured to include one or both of these steps in situations where the secondary device(s) 122 are used to select at least one object. The analysis and prioritization steps (6612, 6614) may include analysis based on artificial intelligence, image recognition, audio analysis (including, for example, speech/voice recognition), and other algorithms (as described above) and ensures that the system 1000a allocates resources to the most critical object(s). In some embodiments, the system 1000a prioritizes objects/people that pose the greatest threat and/or are most dangerous, objects with the greatest potential for intelligence gathering (written documents, computers, maps, etc.), and/or any other appropriate quality. For example, if the system 1000a identifies three people where one is armed with a firearm, the system 1000a will prioritize the armed person for further analysis. In some cases, the system 1000a may prioritize an object identified as a potential explosive including, for example, a vest worn by a person identified or an object identified as a potential improvised explosive device (IED). The prioritization may dictate that the prioritized object is analyzed separately before other detected object(s) while, in other embodiments, multiple objects are analyzed in parallel but the prioritized object receives greater resources and priority for reporting to the operator and/or headquarters.

Step 6616 occurs after the identified object(s) are prioritized (after step 6608 and/or step 6614 as described above). In step 6616, the system 1000a determines whether the identified object(s) are human or non-human. As shown in FIG. 10, object(s) identified as human proceed to step 6618 for analysis and object(s) identified as non-human proceed to step 6626 for analysis.

Non-human object analysis begins at step 6626 where the object is compared to a database(s) of objects compiled for known criminals, fugitives, terrorists, and/or other individuals (collectively risk individuals), where the object may be matched to a risk individual and/or to an object affiliated with a risk individual. In some cases, the system 1000a has previously identified and/or categorized the object (e.g., see step 6612) while there may be further analysis at step 6626 (in addition to comparisons to databases). Step 6628 is where system 1000a determines whether the non-human object matches any object in the database(s). If the non-human object does match at least one object in a database, the system 1000a moves to step 6630 where a notification is sent to the operator and/or a central database (e.g., a headquarters). If the non-human object does not match an object in the database(s), the system 1000a moves to step 6632 where a threat level of the object is assessed. In some embodiments, as shown in FIG. 10, the system 1000a assesses all human and non-human objects (that do not match databases for risk individuals or objects associated with risk individuals) in step 6632 (i.e., all negative results from steps 6620 and 6628 lead to step 6632). In some embodiments, although not shown in FIG. 10, human objects have a separate and distinct set of threat assessment and evaluation steps (e.g., see steps 6632, 6634) from those for non-human objects. After assessment, in step 6634 the system 1000a classifies the object(s) into one of three threat levels: high, low, and none. However, in other embodiments, step 6634 may have any number of threat levels including two (yes or no), four (high, medium, low, none), or any appropriate number of threat levels. If the object is classified as a high threat level (e.g., a weapon is aimed at the operator and/or at a hostage), the system 1000a moves to step 6622 where the trigger resistance is decreased (e.g., using trigger strength arm 125 and trigger servo 128, as described above). The trigger strength (i.e., the force require to actuate the trigger) may be decreased to a minimum in step 6622 to reduce the likelihood that an operator (and/or an innocent bystander) will be harmed by the object. In some cases, the reduction of the trigger resistance at step 6622 may decrease the operator's reaction time (i.e., help the operator react faster to a threat). If the object is classified as a low level (e.g., a weapon is nearby and/or within reach of the object), the system 1000a moves to step 6636 where the trigger resistance is adjusted (e.g., using trigger strength arm 125 and trigger servo 128, as described above). The trigger strength (i.e., the force require to actuate the trigger) may be adjusted to a moderate level in step 6636 to reduce the likelihood that an operator (and/or an innocent bystander) will be harmed by the object. In some cases, the reduction of the trigger resistance at step 6636 may decrease the operator's reaction time (i.e., help the operator react faster to a threat). If the object is classified as none or zero threat level at step 6634, the system 1000a returns to step 6604.

Human object analysis begins at step 6618 where the human is compared to database(s) of risk individuals. The data collected for this analysis may include biometric data including, for example, facial scans (for facial recognition), fingerprint data, optical scan(s), retinal scan(s), voice recognition, biochemical data, electrocardiogram (ECG/EKG) data, gait recognition, and/or any other appropriate data. The data may also include non-biometric data that can aid in recognizing individuals, including tattoos, scars, clothing, hairstyles, and/or any other appropriate data. Step 6620 is where system 1000a determines whether the human object matches any object in the database(s) of risk individuals. In some embodiments, if the human object does not match an object in the database(s) of risk individuals, the system 1000a moves to step 6632 where a threat level of the object is assessed (see description above related to steps 6632, 6634, and related outcomes).

If the human object does match an object in the database(s) of high risk individuals at step 6620, the system 1000a moves to step 6622 where the trigger resistance is decreased (e.g., using trigger strength arm 125 and trigger servo 128, as described above). The trigger strength (i.e., the force require to actuate the trigger) may be decreased to a minimum in step 6622 to reduce the likelihood that an operator (and/or an innocent bystander) will be harmed by the human object. In some cases, the reduction of the trigger resistance at step 6622 may decrease the operator's reaction time (i.e., help the operator react faster to a threat). As shown in FIG. 10, in some cases, a high threat level at step 6634 and an affirmative outcome from step 6620 may both lead to the trigger adjustment at step 6622. However, in other embodiments, there may be separate and distinct outcomes for the high threat level at step 6634 and the affirmative outcome from step 6620. For example, each of these outcomes may lead to a separate and distinct trigger adjustment step and notification (similar to steps 6622, 6624) where the trigger adjustment and notification are customized for the threat level detected and/or the risk individual identified.

In some embodiments, the notification at step 6624 is sent with a higher priority compared to other notifications for the low risk search 662 (i.e., steps 6630, 6638). In other words, the system 1000a is organized to provide a clear and conspicuous message to the operator (and/or centralized organization) that a risk individual and/or a high threat level has been identified. The system 1000a may be arranged such that the notification at step 6638 is minimal (i.e., particularly if there is a large volume of objects being scanned where most result in step 6638). In some cases, the notification at step 6630 (indicating an object relevant to a high risk individual) is sent with higher priority than a notification at step 6638.

Although not explicitly shown in FIG. 10, each time the system 1000a reaches a step where a notification is executed (e.g., see steps 6624, 6630, 6638, etc.) the low risk search 662 may loop back to step 6604. The low risk search 662 may be configured to analyze a plurality of objects simultaneously in parallel with one another. In some embodiments, the system 1000a is designed to cycle from step 6604 to one of the notification steps (e.g., see steps 6624, 6630, 6638, etc.) multiple times per second (in some cases, as fast as thousands of times per second).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The components of any of the system 1000*a*, firearm 10, and/or other relevant parts described herein may be formed of materials including, but not limited to, thermoplastic, carbon composite, plastic, silicone, nylon, polyetherimide, steel, aluminum, stainless steel, high strength aluminum alloy, other plastic or polymer materials, other metallic materials, other composite materials, or other similar materials. Moreover, the components may be attached to one another via suitable fasteners, which include, but are not limited to, screws, bolts, rivets, welds, over molding, injection molding, epoxy, or other mechanical or chemical fasteners.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A threat assessment system comprising:
at least one camera; and
a trigger strength adjustment mechanism capable of adjusting the resistance of a trigger during operation of the threat assessment system without input from a user,
wherein the trigger strength adjustment mechanism automatically
prioritizes a subset of identified objects without external input;
compares data for at least one of the subset of identified objects to data from at least one database; and changes a trigger strength when a threat level is detected.

2. The threat assessment system of claim 1, wherein the trigger strength adjustment mechanism is electronically controlled based on inputs received from the at least one camera.

3. The threat assessment system of claim 1, wherein the at least one camera comprises at least one selected from the group of a night vision camera, a thermal camera, an infrared camera, or a forward-looking infrared camera.

4. The threat assessment system of claim 1, further comprising a computing device that connects to and collects data from the at least one camera, wherein the computing device transmits control signals to the trigger strength adjustment mechanism.

5. The threat assessment system of claim 1, further comprising at least one secondary device that comprises at least one selected from the group of a flashlight, a laser, an infrared laser, and an ultraviolet light emitter.

6. The threat assessment system of claim 1, further comprising a latch handle mechanism that attaches the threat assessment system to a firearm.

7. The threat assessment system of claim 1, wherein the trigger strength adjustment mechanism comprises a servo.

8. The threat assessment system of claim 1, wherein the at least one database is stored in at least one location selected from the group of locally within the threat assessment system or remotely from the threat assessment system with wireless access.

9. The threat assessment system of claim 1, wherein the system is configured to automatically determine whether an object detected by the camera is human or non-human.

10. The threat assessment system of claim 1, wherein the at least one database comprises at least one selected from the group of:

a database of biometric information for violent criminals;

a database of biometric information for terrorists;

a database of biometric information for hostages; or a database of biometric information for law enforcement officers.

11. A system for assessing threats comprising:

a processor and a non-transitory computer-readable medium coupled to the processor, the non-transitory computer-readable medium comprising instructions that, when executed by the processor, cause the processor to:

detect a physical location of the system;

establish a connection to at least one database;

identify and analyze a plurality of objects without external input;

prioritize a subset of the plurality of objects without external input;

determine whether each of the subset of the plurality of objects is human or non-human;

compare data for at least one of the subset of the plurality of objects to data from the at least one database; and change a trigger strength when a threat level is detected.

12. The system of claim 11, wherein the processor is further configured to output at least one notification wherein the at least one notification is wirelessly transmitted to a remote location.

13. The system of claim 11, wherein the processor is further configured to operate a trigger strength adjustment mechanism based on the comparison of the data for at least one of the subset of the plurality of objects to data from the at least one database.

14. The system of claim 11, wherein the processor is further configured to assess the threat level of at least one of the subset of the plurality of objects and classify each object into one of at least two different threat levels.

15. The system of claim 14, wherein the at least two different threat levels comprise high, low, and none.

16. The system of claim 11, wherein the processor is further configured to establish a connection to other nearby similar systems such that the systems pool and share resources.

17. The system of claim 11, wherein the processor is further configured to reduce trigger strength when a high threat level is detected.

18. A method of assessing threats for a system, the method comprising:

detecting a physical location of the system;

establishing a connection to at least one database;

prioritizing a subset of identified objects; and comparing data for at least one of the subset of identified objects to data from the at least one database; and adjusting a trigger strength with electronic controls without input from a user based on a detected threat level.

19. The method of claim 18, further comprising:

distinguishing between a human and a non-human for each of the plurality subset of identified objects.

20. The method of claim 18, further comprising:

assessing the threat level of the at least one of the subset of identified objects; and classifying the at least one of the plurality subset of identified objects into one of at least two different threat levels.

* * * * *